United States Patent [19]
Wang et al.

[11] Patent Number: 5,916,956
[45] Date of Patent: Jun. 29, 1999

[54] ELASTOMER COMPOSITION AND METHOD

[75] Inventors: Meng-Jiao Wang, Lexington; Trevor Alan Brown, Groton; Ralph E. Dickinson, Dracut, all of Mass.

[73] Assignee: Cabot Corporation, Boston, Mass.

[21] Appl. No.: 08/784,802

[22] Filed: Jan. 16, 1997

Related U.S. Application Data

[63] Continuation-in-part of application No. 08/642,681, May 3, 1996.

[51] Int. Cl.$^6$ .................................. C08J 3/40; C08K 3/04
[52] U.S. Cl. .......................... 524/495; 524/492; 524/571; 525/55; 525/99; 525/316; 521/134; 528/376
[58] Field of Search ...................... 524/495, 492, 524/571; 525/99, 55, 316; 521/134; 528/376

[56] References Cited

U.S. PATENT DOCUMENTS

| | | |
|---|---|---|
| 3,048,559 | 8/1962 | Heller et al. . |
| 4,029,633 | 6/1977 | Hagopian et al. . |
| 5,159,009 | 10/1992 | Wolff et al. .............................. 524/495 |
| 5,227,425 | 7/1993 | Rauline . |
| 5,328,949 | 7/1994 | Sandstrom et al. . |
| 5,508,919 | 4/1996 | Agostini et al. ......................... 524/430 |
| 5,674,932 | 10/1997 | Agostini et al. ......................... 524/430 |

FOREIGN PATENT DOCUMENTS

| | | |
|---|---|---|
| 0468140 | 1/1992 | European Pat. Off. . |
| 620250A1 | 3/1994 | European Pat. Off. . |
| 731135 | 9/1996 | European Pat. Off. . |
| WO96 37547 | 11/1996 | WIPO . |

OTHER PUBLICATIONS

Research Disclosure, "Functionalization of Elastomers by Reactive Mixing", No. 362, pp. 308–312, Jun. 1, 1994.
Research Disclosure, "Improved Process for Exxpro™ (BRXP50) Tire Bladder Manufacturing", No. 375, p. 504, Jul. 1, 1995.
International Search Report PCT/US97/07462, Date of Mailing, Sep. 5, 1997.
Natural Rubber Carbon Black Masterbatches from Field Latex by Shukri Bin Abdul Wahab, K.P. NG, Kamarul Baharain Bin Basir and W.P. Chang, Rubber Research Institute of Malaysia, Kuala Lumpur, Malaysia, pp. 29–41, *Proceedings of NR Technology Seminar*, Dec. 1978.
Functionalization of Elastomers by Reactive Mixing by The Malaysian Rubber Producers's Research Association, the Common Fund for Commodities, pp. 308–312, *Research Disclosure*, Jun. 1994.

*Primary Examiner*—Duc Truong
*Attorney, Agent, or Firm*—Banner & Witcoff, Ltd.

[57] ABSTRACT

In a multi-stage process for producing a substantially unvulcanized elastomer composition, a masterbatch is produced by thermomechanical working in a first or other early stage of the multi-stage process. The masterbatch comprises sulfur crosslinkable hydrocarbon elastomer in which is substantially dispersed, particulate fillers, for example carbon black or silicon-treated carbon black, modified carbon black and/or silica and sulfur crosslinking agent effective to crosslink the hydrocarbon elastomer and selected from sulfur donors and sulfur. The filler and sulfur crosslinking agent can be mixed together as a pre-blend prior to being added to the elastomer. The substantially unvulcanized elastomer is then produced in one or more later stages of the multi-stage process, involving further theromechanical working of the masterbatch. A curative additive comprising accelerator, and optionally additional sulfur crosslinking agent, is added and dispersed in the elastomer in the last stage of the multistage process. In accordance with another aspect, oil is added to the elastomer subsequent to addition and substantial dispersion of the filler and sulfur crosslinking agent. The substantially unvulcanized elastomer composition can be cured or vulcanized to form tire tread and other commercial products. Significant improvement in performance characteristics is achieved by preferred embodiments, including good abrasion resistance and low hysteresis measured, for example, as tan $\delta_{max}$ at 70° C.

31 Claims, 2 Drawing Sheets

ELASTOMER COMPOSITION AND METHOD

RELATED APPLICATION

This application is a continuation-in-part of U.S. patent application Ser. No. 08/642,681 filed on May 3, 1996 entitled Elastomeric Composition with Silicon-Treated Carbon-Black and Pre-Vulcanization Modifier.

FIELD OF THE INVENTION

The present invention relates to novel elastomeric compositions incorporating particulate fillers dispersed in sulfur-crosslinkable hydrocarbon elastomer together with sulfur crosslinking agent.

BACKGROUND

Elastomeric compounds suitable for such applications as motor vehicle tire tread, for example, typically employ carbon black fillers as reinforcing agents to provide high abrasion resistance and good hysteresis properties, including low hysteresis at elevated temperatures (e.g., 70° C.). Other applications employing elastomers exhibiting good abrasion and/or hysteresis properties include other tire components, such as undertread, wedge compounds, sidewall, carcass, apex, bead filler and wire skim, as well as engine mounts and base compounds used in industrial drive and automotive belts. In this regard, it is well-known, of course, that elastomers are not completely elastic, such that upon recovery from deformation only a part of the energy used to deform the elastomer is returned. The lost energy, hysteresis, usually manifests itself in the form of heat. This energy loss can be a significant disadvantage in applications such as tire tread, since it results in undesirable rolling resistance. Thus, the hysteresis of an elastomeric compound under cyclic deformation, such as the cyclic deformation experienced by a tire tread in normal usage, is the difference between the energy applied to deform the elastomeric composition and the energy released as the elastomeric composition recovers to its initial undeformed state.

Hysteresis is known to be well-characterized by a loss tangent, tan $\delta$, the ratio of the loss modulus to the storage modulus, that is, viscous modulus to elastic modulus. Also characterized as the ratio of energy lost to energy returned, the loss factor tan $\delta$ is widely used to indicate tire performance properties. Tan $\delta$ values of an elastomeric composition used in tire tread, measured at low temperatures (for example, −30° C. to 0° C.) are used as an indication of wet traction capability, with higher values being desirable. For rolling resistance, typically, measurement of tan $\delta$ may be based on a temperature in the range of 40° C. to 70° C., with lower values being desirable. However, the amplitude of deformation also has a significant effect on performance, so it is also known to test hysteresis over a strain sweep (corresponding to a range from low to high deformation amplitude) at one or more fixed temperatures. The highest value measured for a given temperature, tan $\delta_{max}$, is an indicator of rolling resistance, with lower values of tan $\delta_{max}$ being desirable as corresponding to lower rolling resistance. Thus, tires made with a tire tread compound having lower hysteresis measured at higher temperatures, such as 40° C. or higher, will have correspondingly lower rolling resistance, which in turn can result in reduced fuel consumption by a vehicle equipped with such tires. Desirably, however, such tire tread compound should also have high hysteresis at low temperature for good wet traction.

Particulate filler materials in addition to carbon black also are known for use in elastomeric compositions, including various grades of silica. Silica alone as a reinforcing agent for elastomer typically yields compositions having poor performance characteristics for tire applications, compared to the results obtained with carbon black alone as a reinforcing agent. It has been theorized that strong filler-filler interaction and poor filler-elastomer interaction may account, in part, for such performance properties of silica alone. The silica-elastomer interaction can be improved by chemically bonding the two with a silane coupling agent, such as bis(3-triethoxysilylpropyl) tetra-sulfane, commercially available as Si-69 from Degussa AG (Germany). Coupling agents such as product Si-69 are generally believed to create a chemical linkage between the elastomer and the silica, thereby coupling the silica to the elastomer. When the silica is chemically coupled to the elastomer, certain performance characteristics of the resulting elastomeric composition are enhanced. When incorporated into vehicle tires, certain such elastomeric compounds have been found to provide, for example, improved hysteresis balance. Unfortunately, silica fillers typically are more expensive than comparable carbon black fillers, resulting often in an undesirable cost penalty for their use in elastomeric compositions. In addition, silane coupling agents such as Si-69 are quite costly, further exacerbating the cost penalty.

Coupling agents suitable for silica fillers are discussed, for example, in F. Thurn and S. Wolff, Kautsch. Gummi Kunstst. 28, 733 (1975)). As noted there, such coupling agents are generally composed of a silane compound having a constituent component or moiety (the silane portion) capable of reacting with the silica surface and, also, a constituent component or moiety capable of reacting with the elastomer molecule, particularly a sulfur vulcanizable rubber having carbon-to-carbon double bonds or unsaturation. In this manner, the Thurn et al paper states that the coupling agent acts as a connecting bridge between the silica and the rubber and thereby enhances the rubber reinforcement performance of the silica filler. A report by the Malaysian Rubber Producers Research Association ("the MRPRA report"), *Functionalization of Elastomers by Reactive Mixing*, Research Disclosure—Jun. 1994 (p. 308) shows a vulcanized 60:40 natural rubber:EPDM elastomer blend comprising 50 phr N660 carbon black filler to have less bound rubber (g/g black) in the natural rubber portion and more in the EPDM portion when modified by reaction with chemicals currently employed in accelerated sulfur vulcanization of rubber compounds, including bis-4-(1,1-dimethylpropyl)phenoldisulfide ("BAPD") and dithiodimorpholine ("DTDM"). The use of dithiodicaprolactam ("DTDC") is shown to yield increased bound rubber in both. The modification by mixing at temperatures in excess of 150° C. is said to yield improved properties in the ultimate vulcanizates. An increase is reported for both SBR and EPDM-1 through modification of the elastomer with dithiodicaprolactam during mixing of the elastomer with 50 phr N330 carbon black. Other additives have been suggested for use together with curatives or a vulcanization system, including 1,3-bis(citracon imidomethyl) benzene ("BCI-MX") sold under the trade name Perkalink 900, Akzo Nobel Chemicals, Inc., Akron, Ohio, USA. Such BCI-MX additive is said to serve as an antireversion agent during curing of a composition incorporating CBS, 6PPD, APDS, carbon black (N-375), aromatic oil (Dutrex 729 BP), zinc oxide, stearic acid and sulfur. The MRPRA report and another such report were characterized in Rubber Reviews (published by the Rubber Division, American Chemical Society) as showing modification of elastomers with sulfur donors by mixing at the elevated temperatures typical of the preparation of masterbatches in an internal mixer to achieve low levels of modification both in the absence and presence of carbon black during mixing. Such modification of the elastomers is analogized there to elastomer modification wherein a functional group (e.g., morpholine, caprolactam or alkyl phenol mono-sulfide) is bound to the rubber via a sulfur link, and this functional group is then later displaced, e.g., by 2-mercaptobenzothiazole ("MBT") etc., to create a crosslink precursor site on the rubber.

It is an object of the present invention to provide novel elastomer compositions having good abrasion and hysteresis properties. In accordance with certain preferred embodiments, it is an object to provide novel multi-stage processes for producing such elastomer compositions. Other objects and features of the invention will become apparent from the following disclosure.

SUMMARY

In accordance with a first aspect, a multi-stage process for producing substantially unvulcanized elastomer composition includes the step of producing a masterbatch comprising sulfur crosslinkable hydrocarbon elastomer, particulate filler such as carbon black etc., and sulfur crosslinking agent effective to crosslink the hydrocarbon elastomer. The term "multi-stage process" here refers to a process which has multiple mixing stages, such as can be performed in an internal mixer or a "mill" having rollers or the like. Optionally, heat is added during one or more of the individual mixing or working stages, such that it may be referred to as a thermomechanical working stage, and the elastomer composition is cooled between stages. Thus, the term working is used here to mean mechanical mixing of the elastomer and other ingredients. The aforesaid masterbatch is produced by working of the elastomer, filler and sulfur components in at least one stage, referred to here as an early stage, preferably being a thermomechanical working stage carried out in an internal mixer. Preferably the early stage is the first stage of the multi-stage process and results in substantially dispersing the filler and sulfur crosslinking agent into the elastomer. Substantially dispersing means dispersing into the elastomer sufficiently to mechanically incorporate the filler, etc., at least fairly uniformly into the elastomer matrix. After the initial masterbatch is formed, the aforesaid substantially unvulcanized elastomer composition is produced by further processing in one or more additional working stages of the multi-stage process. The additional stage(s) after the initial masterbatch is formed may be referred to here as subsequent or post stage(s), and preferably there is either one or two such post stages. Such post stage(s) comprise further mixing or working of the masterbatch produced in the early stage. The multi-stage process most preferably has two or three working stages, of which the aforesaid early stage is a first thermomechanical working stage. Elastomeric compositions in accordance with certain preferred embodiments of the present invention can optionally, therefore, comprise, in addition to the elastomer, filler and sulfur crosslinking agent, various processing aids, oil extenders, antidegradents and other materials.

In certain preferred embodiments, as discussed in further detail below, the sulfur crosslinking agent and filler are added to the elastomer in a first stage of a two or three stage process, with the resulting masterbatch produced by such first stage being free or substantially free of any accelerator effective to accelerate the crosslinking functionality of the sulfur crosslinking agent. Typically, a curative additive or accelerator system is added in the last stage of the multi-stage process, comprising accelerator and, optionally, additional sulfur crosslinking agent. To avoid or minimize crosslinking, most typically heat is not added during such last stage when the vulcanization system is being mixed in and dispersed throughout the elastomer composition.

In accordance with another aspect, the masterbatch produced prior to the last stage of the multi-stage process further comprises processing oil, such as, for example, any of the aromatic oils, paraffin oils, etc., known for use with carbon black and other fillers in sulfur crosslinkable hydrocarbon elastomer compositions. In accordance with this aspect, oil is added prior to the last stage, but subsequent to the addition and at least substantial dispersion of the sulfur crosslinking agent and filler into the elastomer. Thus, for example, in certain preferred embodiments, the sulfur crosslinking agent and filler can be admixed together to form a pre-blend which is added to the elastomer during the first stage, followed after a certain period of thermomechanical working by addition of the oil. In accordance with another aspect, a vulcanizate (vulcanized or cured rubber) is produced by vulcanizing the above-disclosed elastomer composition. In accordance with certain preferred embodiments, tire tread is formed as such a vulcanizate.

In accordance with preferred embodiments, elastomer compositions are provided having significantly improved abrasion and hysteresis properties, as further discussed in detail below. Moreover, such elastomer compositions can be produced through the novel employment of materials and processing equipment already in use and known to those skilled in the art. Thus, implementation of the present invention can be achieved in preferred embodiments with relatively low cost. In fact, elastomer compositions achieving a certain desired level of performance characteristics can in many instances be produced at reduced cost, since such performance characteristics may be achieved even with reduced usage levels of expensive ingredients such as coupling agent Si-69 mentioned above.

This surprising result of achieving improved hysteresis, especially high temperature hysteresis, and improved abrasion properties, even at reduced usage levels of expensive coupling agents widely employed to enhance such properties, presents a commercially significant technological advance. Additional aspects, features and advantages of the invention will be apparent from the following detailed discussion of certain preferred embodiments.

DETAILED DESCRIPTION OF CERTAIN PREFERRED EMBODIMENTS

Figure 1:
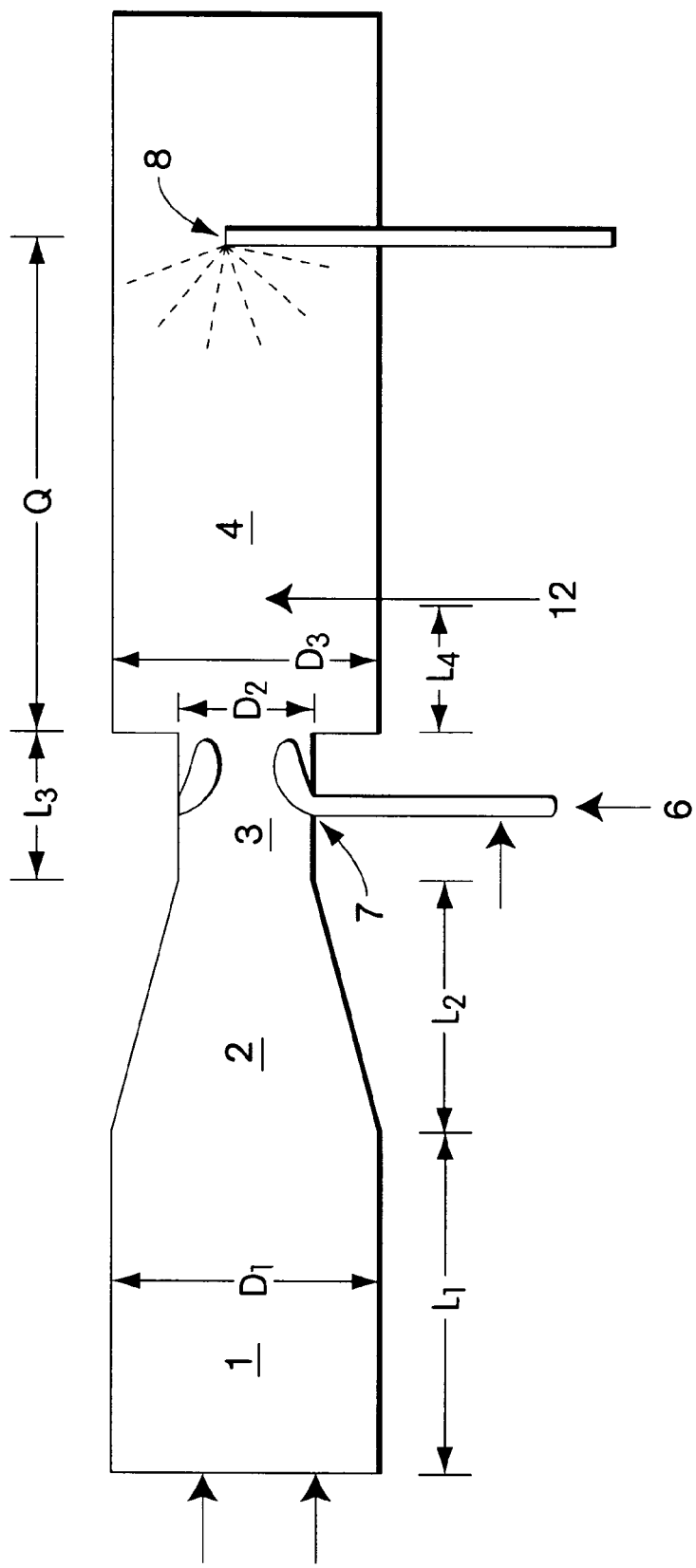
FIG. 1 is a schematic view of an operating portion of one type of carbon black reactor which may be used to produce silicon-treated carbon blacks suitable for use in elastomer compositions of the present invention.

The multi-stage process for producing substantially unvulcanized elastomer composition typically will produce a so-called base compound, that is, an elastomer composition comprising substantially all components or ingredients necessary for subsequent vulcanization. Such base compound may be suitable for room temperature cure or vulcanization, or more typically, for vulcanization at elevated temperatures in a forming mold, e.g., to produce motor vehicle tire tread. Alternatively, in certain preferred embodiments, the multi-stage process produces a masterbatch lacking at least one component or ingredient necessary for vulcanization. Such masterbatch can be combined with the required additional ingredients, typically during subsequent thermomechanical working stages.

Numerous suitable sulfur crosslinkable hydrocarbon elastomers for the elastomer composition are commercially available. Exemplary suitable hydrocarbons include but are not limited to, rubbers, and homo-polymers, co-polymers, terpolymers, etc., of 1,3-butadiene, styrene, isobutylene, 2,3-dimethyl-1,3-butadiene, acrylonitrile, ethylene, propylene and suitable mixtures of one or more of these. Preferably, the elastomer has a glass transition temperature (Tg) as measured by differential scanning colorimetry (DSC) ranging from about −120° C. to about 0° C. or above. Examples include, but are not limited to, styrene-butadiene rubber (SBR), natural rubber, polybutadiene, poly (styrene co-butadiene) polyisoprene, ethylene-propylene copolymer, isobutylene, isopropylene and their oil-extended derivatives. Blends of any of the foregoing may also be used.

Among the rubbers suitable for use with the present invention are natural rubber, and its derivatives, such as chlorinated rubber. Also suitable are synthetic rubbers, such as copolymers of from about 10 to about 70 percent by weight of styrene and from about 90 to about 30 percent by weight of butadiene, copolymer of 19 parts styrene and 81 parts butadiene, a copolymer of 30 parts styrene and 70 parts butadiene, a copolymer of 43 parts styrene and 57 parts butadiene, and a copolymer of 50 parts styrene and 50 parts butadiene; polymers and copolymers of such conjugated dienes such as polybutadiene, polychloroprene, and the like; and copolymers of conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinyl pyridine, alkyl-substituted acrylates, vinyl ketone, methyl isopropenyl ketone, methyl vinyl ether, alpha-methylene carboxylic acids, and the esters and amides thereof, such as acrylic acid and dialkylacrylic acid amide. Also suitable for use herein are copolymers of ethylene and other high alpha olefins such as propylene and butene-1.

Additional suitable elastomers will be readily apparent to those skilled in the art given the benefit of this disclosure.

Suitable sulfur crosslinking agents to be added to and dispersed into the sulfur crosslinkable hydrocarbon elastomer by thermomechanical working in the first or other early stage (i.e., a non-last stage) of the multi-stage process disclosed here for producing unvulcanized elastomer composition, are commercially available. The particular sulfur crosslinking agent(s) employed will be selected, typically, based at least in part on the elastomer and other ingredients selected for use in the composition, and on the intended end use, etc. Exemplary sulfur crosslinking agents include sulfur and such sulfur donors as tetramethylthiuramdisulfide (TMTD), DTDM and the like. Additional suitable sulfur crosslinking agents will be readily apparent to those skilled in the art given the benefit of this disclosure. In this regard, it is recognized that suitable sulfur crosslinking agents include vulcanization agents, such as sulfur, which are well known for addition to an elastomer masterbatch during final mechanical working to produce a vulcanizable composition. Such late or last stage addition typically involves a vulcanization system or set of ingredients including, in addition to the sulfur or other vulcanization agent, accelerators effective to accelerate the vulcanization action of the sulfur when the elastomer composition is subsequently vulcanized, such as, for example, any of the sulfenamide accelerators. In the multi-stage processes and materials disclosed here, suitable vulcanization additives may be correspondingly added in a later or, preferably, last mechanical working stage of the multi-stage process. Such vulcanization additives may include sulfur and/or other sulfur-donor additional to the sulfur crosslinking agent added— in accordance with the present invention—during the first or other early stage of the multi-stage process.

The present invention presents a significant advance in the art, in that the advantages in end product performance characteristics, such as improved abrasion resistance and/or improved (i.e., lower) high temperature hysteresis, especially for tire tread applications, achieved through early stage addition of sulfur crosslinking agent in a multi-stage process, have not heretofore been recognized. In particular, it has not heretofore been recognized to add and substantially homogeneously disperse sulfur or sulfur donor crosslinking agent with particulate mineral filler into accelerator-free elastomer (meaning sulfur crosslinkable hydrocarbon elastomer substantially free of any accelerator which would be effective to accelerate vulcanization action of such crosslinking agent in that elastomer). Thus, thermomechanical working of the elastomer, even at a temperature which would be sufficient to vulcanize the elastomer in the presence of a vulcanizing system including both the crosslinking agent and a suitable accelerator, is achieved as a non-productive step, at least in part by exclusion of such accelerator and/or other components of an effective vulcanization system for the elastomer.

A masterbatch comprising the sulfur crosslinking agent and filler highly or well dispersed in substantially accelerator-free unvulcanized elastomer can be produced by thermomechanical working employing known equipment and techniques. Typically, for example, mechanical working in a suitable mixer, such as an internal mixer or extruder will be carried out for a suitable period of time, generally having a duration of 10 seconds to 20 minutes, and reaching a maximum temperature between 130° C. and 180° C. It will be understood that the precise processing parameters will depend in part on the performance characteristics of the mixing apparatus and the filler loading level, as well as the performance characteristics and morphology desired in the resultant masterbatch. In general, the thermomechanical working should achieve an excellent dispersing of the filler and sulfur crosslinking agents, and reactive intermixing. A suitable multi-step thermomechanical working process is disclosed, for example, in U.S. Pat. No. 5,227,425 to Rauline, the disclosure of which is hereby incorporated by reference. It will be within the ability of those skilled in the art, given the benefit of the present disclosure, to determine suitable thermomechanical mixing parameters for a given application. It is significant in this regard, that the early stage during which the sulfur-crosslinking agent is added is a non-productive working stage. The term non-productive working stage is used here to mean a working stage which yields a masterbatch or base composition which is substantially unvulcanized. The resulting masterbatch can then be further processed and subsequently vulcanized in accordance with known materials and techniques. Thus, the masterbatch produced by such early stage thermomechanical working is substantially unvulcanized. The term substantially unvulcanized means the masterbatch produced by the early stage working is suitable for subsequent processing, such as further mechanical working, extrusion, calendering, molding, etc. Likewise, the base compound produced by the multistage process disclosed here is substantially unvulcanized in the sense that it also is suitable for such further processing. Substantially unvulcanized base compound produced by the completed multi-stage process can be vulcanized in accordance with known techniques using commercially known vulcanization systems suited to the choice of elastomer(s). In that regard, it should be recognized that some portion of the sulfur crosslinking agent may be present in its original chemical state in the unvulcanized base compound and even in subsequent elastomer products. Typically, however, the sulfur crosslinking agent is present in the base compound primarily as its reaction product with the other constituents of the composition.

The precise amount of sulfur crosslinking agent suitable for a given masterbatch will depend to an extent on the choice of materials, the intensity and duration of the thermomechanical working step to produce the masterbatch, and the performance characteristics and morphology desired in the intermediate and ultimate products. The last mentioned factor will depend in some measure, of course, on the intended application of the product, and the preferred ranges stated here are especially applicable to masterbatch compositions and base compositions intended for tire tread applications. Preferably, the sulfur crosslinking agent will be added during the first stage in an amount of about 0.05 phr to 10.0 phr, more preferably about 0.2 to 6.0 phr, e.g., if using sulfur 1.0 to 1.8 phr. It will be within the ability of those skilled in the art, given the benefit of the present disclosure, to determine suitable usage levels based on the particular materials chosen, the intended processing parameters and the intended results. In general, in an early stage composition as disclosed here, intended for use in preparing a tire tread elastomer, having about 30 to 120 phr carbon black, modified carbon black or silica and employing natural rubber, SBR, BR or the like, sulfur or comparable sulfur donor will be used, for example, in an amount of about 0.2 to 10.0 phr, more preferably 0.2 phr to 6 phr.

In accordance with one example, the unsaturated elastomer is SBR, such as SBR having approximately 60% vinyl content, and sulfur is added in the first stage in an amount from 0.2 phr to 6 phr. Such first stage thermomechanical working remains substantially non-productive, notwithstanding that the working temperature reaches or exceeds the vulcanization temperature, although slight crosslinking may occur during this treatment. Without wishing to be bound by theory, it can be surmised that very few crosslinks are being added to the elastomer compositions. The crosslinks at this stage are sufficiently few that processability is not significantly changed. An observed minor viscosity increase may be preventing or reducing reagglomeration of the filler aggregates with resultant low hysteresis at high temperature. In accordance with the principles discussed above, such addition of sulfur to the base composition is done without addition of cure activators or accelerators or the like to preserve the non-productive nature of the preliminary thermomechanical working of the base composition.

Irrespective of the underlying mechanism, it is highly significant that vulcanized elastomeric compositions provided here in accordance with preferred embodiments, are found to have significantly improved high temperature hysteresis and abrasion characteristics. Preferred embodiments illustrating these advantageous results are further disclosed in the examples below. These examples are intended as illustrations and not as limitations upon the scope of the invention.

The sulfur crosslinking agent can be provided in the form of a pre-blend, i.e., in substantially homogeneous admixture with the filler. Alternatively, the filler and the sulfur crosslinking agent can be separately or individually added to the elastomer during the early stage thermomechanical working to prepare a masterbatch.

Particulate filler suitable for use in the processes and materials disclosed here include, for example, carbon black. Also suitable are silicon-treated carbon black, silicon-coated carbon black, oxidized carbon black (optionally silicon containing), carbon black (optionally silicon-containing) having attached functional groups and the like, all of which are referred to here collectively as modified carbon blacks. Silica filler also is suitable for use, as are blends or mixtures of carbon blacks, modified carbon blacks and/or silica in the processes and materials disclosed here. Exemplary carbon black fillers include numerous commercially available materials, such as N660, N330, N234 and N110 and the like. Other suitable carbon blacks will be readily apparent to those skilled in the art in view of this disclosure. With respect to the morphology of silicon-treated carbon black, a silicon-containing species, including but not limited to oxides and carbides of silicon (e.g., silica), are distributed in at least a portion of a carbon black aggregate as an intrinsic part of the carbon black. The silicon-treated carbon black may have silicon-containing regions primarily at the surface of the carbon black aggregates, or distributed throughout the aggregates, or both. Mixtures of different types of silicon-containing carbon blacks also may be used. The silicon-treated carbon black aggregates are not merely a mixture of discrete carbon black aggregates and discrete silica aggregates. Rather, the silicon-treated carbon black aggregates employed in the compositions disclosed here include at least one silicon-containing region either at the surface of or within the carbon black aggregate. When the silicon-treated carbon black is examined under STEM-EDX, the silicon signal corresponding to the silicon-containing species is found to be present in individual carbon black aggregates, meaning that the silicon-containing species is an intrinsic part of the carbon black aggregate. By comparison, for example, in a physical mixture of silica and carbon black, STEM-EDX examination reveals distinctly separate silica and carbon black aggregates.

Silicon-treated carbon blacks may by obtained by manufacturing carbon black in the presence of volatilizable silicon-containing compounds. Suitable methods are described, for example, in U.S. patent application Ser. No. 08/446,141 entitled "Elastomeric Compounds Incorporating Silicon Treated Carbon Blacks." Such carbon blacks are preferably produced in a modular or "staged" furnace carbon black reactor as depicted in FIG. 1. The furnace carbon black reactor has a combustion zone 1, with a zone of converging diameter 2 ; a feedstock injection zone with restricted diameter 3; and a reaction zone 4. To produce carbon blacks with such reactors, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor, or liquid streams such as natural gas, hydrogen, methane, acetylene, alcohols, or kerosene. It is generally preferred, however, to use fuels having a high content of carbon-containing components, in particular, hydrocarbons. Preferred carbon black feedstocks include petroleum refinery sources such as decanted oils from catalytic cracking operations, as well as the by-products from coking operations and olefin manufacturing operations. The ratio of air to fuel varies with the type of fuel utilized. When natural gas is used to produce the carbon blacks, the ratio of air to fuel may be from about 10:1 to about 1000:1. To facilitate the generation of hot combustible gases, the oxidant stream may be pre-heated. The hot combustible gas stream flows downstream from zones 1 and 2 into zones 3 and 4. The direction of the flow of hot combustion gases is shown in FIG. 1 by the arrow. Carbon black feedstock 6 is introduced at point 7 into the feedstock injection zone 3. The feedstock is injected into the gas stream through nozzles designed for optimal distribution of the oil in the gas stream. Such nozzles may be either single or bi-fluid. Bi-fluid nozzles may use a steam of air to atomize the fuel. Single-fluid nozzles may be adapted to inject pressure atomized feedstock or the feedstock can be directly injected into the gas-stream.

The mixture of carbon black-yielding feedstock and hot combustion gases flows downstream through zone 3 and 4. In the reaction zone portion of the reactor, the feedstock is pyrolized to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. The distance from the beginning of reaction zone 4 to quench point 8, referred to here as distance "Q," will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is generally subjected to a pelletization step.

Silicon-treated carbon blacks suitable for use in the processes and materials disclosed here can be made by introducing a volatilizable silicon-containing compound into the carbon black reactor at a point upstream of the quench zone. Useful silicon-containing feeds are volatilizable at carbon-black reactor temperatures. Examples include, but are not limited to, silicates such as tetraethoxy orthosilicate (TEDS) and tetramethoxy orthosilicate, silanes such as tetrachlorosilane and trichloromethylsilane, and volatile silicone polymers such as octamethylcyclotetrasiloxane (OMTS). The flow rate of the volatilizable compound will determine the weight percent of silicon in the treated carbon black. The weight percent of silicon in the treated carbon black should range from about 0.1% to 25%, and preferably about 0.5% to about 10%, and most preferably about 2% to about 6%. It has been found that injecting silicon containing compound into the carbon black reactor results in an increase in the structure (e.g., CDBP) of the product. This is desirable in many applications of carbon black.

The volatilizable compound may be pre-mixed with the carbon black-forming feedstock and introduced with the feedstock into the reaction zone. Alternatively, the volatilizable compound may be introduced to the reaction zone separately form the feedstock injection point. Such introduction may be upstream or downstream from the feedstock injection point, provided the volatilizable compound is introduced upstream from the quench zone. For example, referring to FIG. 1, the volatilizable compound may be introduced to zone Q at point 12 or any other point in the zone. Volatilization and exposure to high temperatures in the reaction zone yields silicon-treated carbon black, such that the silicon or silicon containing species becomes an intrinsic part of the carbon black. Besides volatalizable compounds, decomposable compounds which are not necessarily volatilizable can also be used to yield the silicon-treated carbon black. If the volatilizable compound is introduced substantially simultaneously with the feedstock, the silicon-treated regions are distributed throughout at least a portion of the carbon black aggregate.

In a second approach, the volatilizable compound is introduced to the reaction zone at a point after the carbon black formation has commenced but before the reactor stream has been subjected to the quench. Silicon-treated carbon black aggregates are then obtained in which a silicon-containing species is present primarily at or near the surface of the carbon black aggregate.

It has been found by the present inventors that the elastomeric compounds may be additionally compounded with one or more coupling agents to further enhance the properties of the elastomeric compound. Coupling agents, as used herein, include, but are not limited to, compounds that are capable of coupling fillers such as carbon black or silica to an elastomer. Coupling agents useful for coupling silica or carbon black to an elastomer, are expected to be useful with the silicon-treated carbon blacks. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), y-mercaptopropyl-trimethoxy silane (A189, from Union Carbide Corp., Danbury, Conn.); zirconate coupling agents, such as zirconium dineoalkanolatodi(3-mercapto-) propionato-O (NZ 66A, from Kenrich Petrochemicals, Inc., of Bayonne, N.J.); titanate coupling agents; nitro coupling agents, such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S which is a mixture of Si-69 and N330 carbon black, available from Degussa AG.

Optionally, the filler, such as carbon black or silicon-treated carbon black, incorporated in the elastomeric compound of the present invention may be oxidized. Suitable oxidizing agents include, but are not limited to, nitric acid and ozone. Coupling agents which may be used with the oxidized silicon-treated fillers include, but are not limited to, the coupling agents set forth above.

Also, as noted above, suitable carbon blacks and modified carbon blacks may have attached functional organic groups.

One process for attaching an organic group to the carbon black (reference to carbon black in this discussion of fillers having attached organic groups includes suitable modified carbon blacks, such as suitable silicon-containing carbon blacks) involves the reaction of at least one diazonium salt with a carbon black in the absence of an externally applied current sufficient to reduce the diazonium salt. This is, the reaction between the diazonium salt and the carbon black proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries. In another process, at least one diazonium salt reacts with a carbon black in a protic reaction medium. Mixtures of different diazonium salts may be used in this process of the invention. This process can also be carried out under a variety of reaction conditions. Preferably, in both processes, the diazonium salt is formed in situ. If desired, in either process, the carbon black product can be isolated and dried by means known in the art. Furthermore, the resultant carbon black product can be treated to remove impurities by known techniques. The various preferred embodiments of these processes are discussed below. These processes can be carried out under a wide variety of conditions and in general are not limited by any particular condition. The reaction conditions must be such that the particular diazonium salt is sufficiently stable to allow it to react with the carbon black. Thus, the processes can be carried out under reaction conditions where the diazonium salt is short lived. The reaction between the diazonium salt and the carbon black occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry; Reactions, Mechanisms, and Structures*, 4th Ed., (Wiley, 1992). According to this invention, a diazonium salt is an organic compound having one or more diazonium groups. The diazonium salt may be prepared prior to reaction with the carbon black, or more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in situ. A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as, for example, isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$. The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt. Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNo_2$ or $HNO_3/NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in the basic media. However, the diazonium salt need only be sufficiently stable to allow reaction with the carbon black. Thus, the processes can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. Reagents can be added to form the diazonium salt in situ, to a suspension of carbon black in the reaction medium, for example, water. Thus, a carbon black suspension to be used may already contain one or more reagents to generate the diazonium salt and the process accomplish ed by adding the remaining reagents.

Reaction i to form a diazonium salt are compatible wit h a large variety of functional groups commonly found on organic compounds. Thus, only the availability of a diazonium salt for reaction with a carbon black limits the processes of the invention. The processes can be carried out in any reaction medium which allows the reaction between the diazonium salt and the carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF). Acetonitrile, and benzonitrile. For a discussion of protic and aprotic solvents see Morrison and Boyd, *Organic Chemistry*, 5th Ed., pp. 228–231, (Allyn and Bacon, Inc. 1987). The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbon black can take place with any type of carbon black, for example, in fluffy or pelleted form. In one embodiment designed to reduce production costs, the reaction occurs during a process for forming carbon black pellets. For example, a carbon black product of the invention can be prepared in a dry drum by spraying a solution or slurry of a diazonium salt onto a carbon black. Alternatively, the carbon black product can be prepared by pelletizing a carbon black in the presence of a solvent system, such as water, containing the diazonium salt or the reagents to generate the diazonium salt in situ. Aqueous solvent systems are preferred. Accordingly, another embodiment provides a process for forming a pelletized carbon black comprising the steps of: introducing a carbon black and an aqueous slurry or solution of a diazonium salt into a pelletizer, reacting the diazonium salt with the carbon black to attach an organic group to the carbon black, and pelletizing the resulting carbon black having an attached organic group. The pelletized carbon black product may then be dried using conventional techniques.

In general, the processes produce inorganic by-products, such as salts. In some end uses, such as those discussed below, these by-products, may be undesirable. Several possible ways to produce a carbon black products without unwanted inorganic by-products or salts are as follows: First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process may also produce organic by-products. They can be removed, for example, by extraction with organic solvents. Other ways of obtaining products without unwanted organic by-products may be known to those of skill in the art and include washing ore removal of ions by reverse osmosis.

The reaction between a diazonium salt and a carbon black forms a carbon black product having an organic group attached to the carbon black. The diazonium salt may contain the organic group to be attached to the carbon black. It may be possible to produce the carbon black products of this invention by other means known to those skilled in the art.

The organic group may be an aliphatic group, a cyclic organic group, or an organic compound having an aliphatic portion and a cyclic portion. As discussed above, the diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyul, thienyl, thiazolyl, furyl, indolyl, and the like). As the steric hinderance of a substituted organic group increases, the number of organic groups attached to the carbon black from the reaction between the diazonium salt and the carbon black may be diminished.

When the organic group is substituted, it may contain any functional group compatible with the formation of a diazonium salt. Preferred functional groups include, but are not limited to, R, OR, COR, COOR, OCOR, carboxylate salts such as COOLi, COONa, COOK, $COO^-NR_4^-$, halogen, CN, $NR_2$, $SO_3H$, sulfonate salts such as $SO_3Li$, $SO_3Na$, $SO_3K$, $SO_3^-NR_4^+$, $OSO_3H$, $OSO_3^-$ salts, NR(COR), $CONR_2$, $NO_2$, $PO_3H_2$, phosphonate salts such as $PO_3HNa$ and $PO_3Na_2$, phosphate salts such as $OPO_3HNa$ and $OPO_3Na_2$, N=NR, $NR_3^+X^-$, $PR_3$, $^+X^-$, $S_kR$, $SSO_3H$, $SSO_3^-$ salts, $SO_2NRR'$, $SO_2SR$, $SNRR'$, SNQ, $SO_2NQ$, $CO_2NQ$, S-(1,4-piperazinediyl)-SR, 2-(1,3-dithianyl) 2-(1,3-dithiolanyl), SOR, and $SO_2R$. R and R', which can be the same or different, are independently hydrogen, branched or unbranched $C_1$–$C_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl, The integer k ranges from 1–8 and preferably from 2–4. The anion $X^-$ is a halide or an anion derived from a mineral or organic acid. Q is $(CH_2)_w$, $(CH_2)_xO(CH_2)_2$, $(CH_2)_xNR(CH_2)_2$, or $(CH_2)_xS(CH_2)_2$, where w is an integer from 2 and 6 and x and z are integers from 1 to 6.

A preferred organic group is an aromatic group of the formula $A_yAr^-$ which corresponds to a primary amine of the formula $A_yArNH_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent in the aromatic radical independently selected from a preferred functional group described above or A is a linear, branched or cyclic hydrocarbon radical (preferably containing 1to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are $NH_2$—$C_6H_4$—, $CH_2CH_2$—$C_6H_4$—$NH_2$, $CH_2$—$C_6H_4$—$NH_2$, and $C_6H_5$.

Another preferred set of organic groups which may be attached to the carbon black are organic groups substituted with an ionic or an ionizable group as a functional group. An ionizable group is one which is capable of forming an ionic group in the medium of use. The ionic group may be an anionic group of a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such as organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers tot he pKa of the organic group as a whole, not just the acidic substituent. More preferably, the pKa is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group, or a carboxylic acid group. Examples of these acidic groups and their salts are discussed above. Most preferably, the organic group is a substituted or unsubstituted sulfophenyl group or a salt thereof; a substituted or unsubstituted (polysulfo)phenyl group or a salt thereof; a substituted or unsubstituted sulphonaphthyl group or a salt thereof; or a substituted or unsubstituted (polysulfo)naphthyl group or a salt thereof. A preferred substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Amines represent examples of ionizable functional groups that form cationic groups. For example, amines may be protonated to form ammonium groups in acidic media. Preferably, an organic group having an amine substituent has a pKb of less than 5. Quaternary ammonium groups ($-NR_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to $(C_5H_4N)$ $C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the carbon black products having an attached organic group substituted with an ionic or an ionizable group is that the carbon black product may have increased water dispersibility relative to the corresponding untreated carbon black. Water dispersibility of a carbon black product increases with the number of organic groups attached to the carbon black having an ionizable group or the number of ionizable groups attached to a given organic group. Thus, increasing the number of ionizable groups associated with the carbon black product should increase its water dispersibility and permits control of the water dispersibility to a desired level. It can be noted that the water dispersibility of a carbon black product containing an amine as the organic group attached to the carbon black may be increased by acidifying the aqueous medium.

Because the water dispersibility of the carbon black products depends to some extent on charge stabilization, it is preferred that the ionic strength of the aqueous medium be less than 0.1 molar. More preferably, the ionic strength is less than 0.01 molar. When such a water dispersible carbon black product is prepared, it is preferred that the ionic or ionizable groups be ionized in the reaction medium. The resulting product solution or slurry may be used as is or diluted prior to use. Alternatively, the carbon black products may be dried by techniques used for conventional carbon blacks. These techniques include, but are not limited to, drying in ovens and rotary kilns. Overdrying, however, may cause a loss in the degree of water dispersibility. In addition to their water dispersibility, carbon black products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of preferred organic groups. Carbon black products having aromatic sulfide groups are particularly useful in rubber compositions. These aromatic sulfides can be represented by the formulas $Ar(CH_2)_qS_k(CH_2)_rAr'$ or $A-(CH_2)_qS_k(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazolylene groups. Preferred aryl groups include phenyl, naphthyl and benzothiazolyl. The number of sulfurs present, defined by k preferably ranges from 2 to 4. Preferred carbon black products are those having an attached aromatic sulfide organic group of the formula $-(C_6H_4)-S_k-(C_6H_4)-$, where k is an integer from 1 to 8, and more preferably where k ranges from 2 to 4. Particularly preferred aromatic sulfide groups are bis-para—$(C_6H_4)-S_2-(C_6H_4)-$ and para—$(C_6H_4)-S_2-(C_6H_5)$. The diazonium salts of these aromatic sulfide groups may be conveniently prepared from their correspondingly primary amines, $H_2N-Ar-S_k-Ar'-NH_2$ or $H_2N-Ar-Sk-Ar''$. Preferred groups include dithiodi-4,1-phenylene, tetrathiodi-4,1-phenylene, phenyldithiophenylene, dithiodi-4,1-(3-chlorophenylene), $-(4-C_6H_4)-S-S-(2-C_7H_4NS)$, $-(4-C_6H_4)-S-S-(4-C_6H_4)-OH$, $-6-(2-C_7H_3NS)-SH$, $-(4-C_6H_4)-CH_2CH_2-S-S-CH_2CH_2-(4-C_6H_4)-$, $-(4-C_6H_4)-CH_2CH_2-S-S-CH_2CH_2-(4-C_6H_4)-$, $-(2-C_6H_4)-S-S-(2C_6H_4)-$, $-(3-C_6H_4)-S-S-(3-C_6H_4)-$, $-6-(C_6H_3N_2S)$, $-6-(2-C_7H_3NS)-S-NRR'$ where RR' is $-CH_2CH_2OCH_2CH_2-$, $-(4-C_6H_4)-S-S-(4-C_6H_4)-$, $-(4-C_6H_4)-CH=CH_2$, $-(4-C_6H_4)-S-SO_3H$, $-(4-C_6H_4)-SO_2NH-(4-C_6H_4)-S-S-(4-C_6H_4)-NHSO_2-(4-C_6H_4)-$, $-6-(2-C_7H_3NS)-S-S-2-(6-C_7H_3NS)-$, $-(4-C_6H_4)-S-CH_2-(4-C_6H_4)-$, $-(4-C_6H_4)-SO_2-S-(4-C_6H_4)-$, $-(4-C_6H_4)-CH_2-S-CH_2-(4-C_6H_4)-$, $-(3-C_6H_4)-CH_2-S-CH_2-(3-C_6H_4)-$, $-(4-C_6H_4)-CH_2-S-S-CH_2-(4-C_6H_4)-$, $-(3-C_6H_4)-CH_2-S-S-CH_2-(3-C_6H_4)-$, $-(4-C_6H_4)-S-NRR'$ where RR' is $-CH_2CH_2OCH_2CH_2-$, $-(-C_6H_4)-SO_2NH-CH_2CH_2-S-S-CH_2CH_2-NHSO_2-(4-C_6H_4)-$, $-(4-C_6H_4)-2-(1,3-dithianyl;)$, and $-(4-C_6H_4)-S-(1,4-piperizinediyl)-S-(4-C_6H_4)-$.

Another preferred set of organic groups which may be attached to the carbon black are organic groups having an aminophenyl, such as $(C_6H_4-NH_2$, $(C_6H_4)-CH_2-(C_6H_4)-NH_2$, $(C_6H_4)-SO_2-(C_6H_4)-NH_2$. Preferred organic groups also include aromatic sulfides, represented by the formulas $Ar-S_n-Ar'$ or $Ar-S_n-Ar''$, wherein Ar and Ar' are independently arylene groups, Ar" is an aryl and n is 1 to 8. Methods for attaching such organic groups to carbon black are discussed in U.S. patent application Ser. Nos. 08/356,660, 08/572,525, and 08/356,459, the disclosures of which are fully incorporated by reference herein.

As stated earlier, the silicon-treated carbon black may also be modified to have at least one organic group attached to the silicon-treated carbon black. A mixture of silicon-treated carbon black and a modified carbon black having at least one attached organic group also may be used.

Furthermore, it is within the bounds of this application to also use a mixture of silica and silicon-treated carbon black. Also, any combination of additional components with the silicon-treated carbon black may be used such as one or more of the following:

a) silicon-treated carbon black with an attached organic group optionally treated with silane coupling agents;
b) modified carbon black having an attached organic group;
c) silica;
d) modified silica, for example, having an attached organic group, and/or
e) carbon black.

Suitable silicon-treated carbon blacks having an organic group attached are disclosed in Patent Cooperation Treaty ("PCT") publication No. WO 96/18674, entitled "EPDM, HNBR and Butyl Rubber Compositions Containing Carbon Black Products," the entire disclosure of which is hereby incorporated by reference herein. Preferred organic groups include aromatic sulfides, represented by the formulas Ar—$S_n$—Ar' or Ar—$S_n$—Ar", wherein Ar and Ar' are independently arylene groups, Ar" is an aryl and n is 1 to 8. Another set of organic groups which may be attached to the silicon-treated carbon black fillers are organic groups substituted with an ionic or an ionizable group as a functional group, as disclosed, for example, in U.S. patent application Ser. No. 356,660, filed Dec. 15, 1994 and entitled "Reaction of Carbon Black with Diazonium Salts, Resultant Carbon Black Products and Their Uses", the entire disclosure of which is hereby incorporated herein by reference. Likewise, silicon coated carbon blacks may have attached organic groups.

Examples of silica include, but are not limited to, silica, precipitated silica, amorphous silica, vitreous silica, fumed silica, fused silica, silicates (e.g., alumino silicates) and other Si containing fillers such as clay, talc, wollastonite, etc. Silicas are commercially available from such sources as Cabot Corporation under the Cab-O-Sil® tradename; PPG Industries under the Hi-Sil and Ceptane tradenames; Rhone-Poulenc under the Zeosil tradename; and Degussa AG under the Ultrasil and Coupsil tradenames.

The loading level of carbon black, silica, modified carbon black and/or other particulate filler in the elastomeric composition will depend on the specific materials selected for use and on the performance properties desired in the intended application. It will be within the ability of those skilled in the art, given the benefit of the present disclosure, to select suitable loading levels for a given application. Generally, for tire tread applications for example, 25 to 120 phr filler will be suitable, more preferably 35 to 90 phr filler. Other suitable fillers may be used instead of or in conjunction with the carbon black and/or silicon-treated carbon black particulate filler, such as various grades of silica suitable to the intended application of the composition. Preferably, such other filler(s) is a minor portion of the total filler content of the composition, such as less than one-half by weight.

As noted above, in accordance with one aspect of the present disclosure, a vulcanizable base compound is formed by first preparing the above described early stage masterbatch and then forming the base compound in a subsequent non-productive working stage in accordance with the principles discussed above, including a finishing step in which a suitable accelerator system is added. The accelerator system is selected to be effective to vulcanize the elastomer at a suitable vulcanization temperature. The accelerator system may comprise, for example, sulfur or a sulfur donor, activators, accelerators and/or other ingredients suitable for vulcanization of the elastomeric compositions. The thermomechanical working of the aforesaid finishing step is carried out preferably at a temperature below the vulcanization temperature to achieve substantially homogenous dispersion of the vulcanization system. Thereafter, a vulcanized elastomer composition can be prepared by vulcanizing the product of the finishing step at a vulcanization temperature. The resultant elastomeric compositions may be used for producing various elastomeric products, such as vehicle tire tread, industrial rubber products, seals, timing belts, power transmission belting and the like, and other rubber goods.

When utilized in tires, the elastomeric compositions disclosed here also may be suitable for other tire components, for example, the carcass or sidewall.

It will be understood by those skilled in the art, given the benefit of the present disclosure, that the compositions disclosed here may further comprise any of various commonly used additive materials. Processing additives, for example, such as oils, resins, including tacifying resins, plasticizers, pigments, fatty acid, zinc oxide, waxes, antioxidants and anti-ozonants, peptizing agents, etc., may be employed in accordance with known techniques at appropriate points during processing. In this regard, in accordance with a significant feature of certain preferred embodiments, oil is added to the above described early stage composition. More specifically, oil is added to be present in the non-productive thermomechanical working of the early stage composition following addition and substantial dispersion (by thermomechanical working for a time after their addition) of the sulfur crosslinking agent and filler. Preferably the sulfur crosslinking agent and filler are added in the first stage, as discussed above, and the oil is added at a later time during such first stage. Alternatively, the sulfur crosslinking agent and filler are added and substantially well dispersed in the elastomer in the first or other early stage (i.e., not the last working stage) of the multi-stage process, and the oil is added and dispersed in any subsequent stage of the multi-stage process. Suitable oils are commercially available and known for use in elastomeric compositions. Exemplary oils include aromatic oils, paraffin oils and the like, and suitable mixtures of any of them. Other suitable oils will be readily apparent to those skilled in the art in view of the present disclosure. The oil is used in the elastomer composition in an amount determined in large part by the choice of other ingredients and the desired performance characteristics of the intermediate and final products. Generally, the oil is used in conventional amounts. For elastomeric compositions made by the process disclosed here and intended for use as tire tread, for example, comprising SBR rubber, carbon black or silicon-treated carbon black and sulfur crosslinking agent (and other ingredients to be added in a subsequent stage, such as a vulcanization system), oil typically would be added in an amount of about 0 to 50 phr, preferably about 0 to 40 phr. The sequence of addition of the oil in accordance with the preferred embodiments disclosed here is found to yield improved performance characteristics, as demonstrated by certain of the following examples.

It should also be understood that significant additional advantages are provided by various preferred embodiments, including the advantage of performance characteristics improved over those of otherwise corresponding elastomer composition not prepared in accordance with the early stage addition and dispersion of sulfur crosslinking agent and, optionally, the delayed addition and dispersion of oil. Most notably, for example, such improved performance characteristics are achieved in certain preferred embodiments even with elimination or reduction in usage amount of expensive coupling agents, such as product Si-69 and the like, discussed above, versus otherwise corresponding compositions not produced in accordance with the process disclosed here.

EXAMPLES

The following examples demonstrates the processes and materials disclosed above. The elastomers and other ingredients used in the examples are listed below, along with the abbreviations used for some of the ingredients.

The Elastomers Used For The Examples

SSBR—solution SBR Duradene 715 from Firestone Synthetic Rubber & Latex Co., Akron, Ohio, U.S.A.

FSSBR—functionalized solution SBR NS114 and/or NS 116, as indicated from Nippon Zeon Co., Japan.

ESBR—emulsion SBR 1500, from Copolymer Rubber & Chemicals, Corp., Baton Rouge, La., U.S.A.

BR—Polybutadiene Taktene, from Bayer Inc., Akron, Ohio, U.S.A.

Other Ingredients Used In The Examples

Carbon black VULCAN 7H®(N234), from Cabot Corporation, Boston, Mass., U.S.A.

CRX 2000—silicon-treated carbon black, from Cabot Corporation, Boston, Mass.

Silica ZEOSIL 116—silica from Rhône-Poulenc, France.

Zinc oxide from New Jersey Zinc Co.

Stearic acid from Emery Chemicals, Cincinnati, Ohio, U.S.A.

Flexzone 7P®—N-(1,3-dimethyl butyl)-N'-phenyl-p-phenylene diamine, an anti-oxidant available from Uniroyal Chemical Co., Middlebury, Conn., U.S.A.

Durax®—N-cyclohexane-2-benzothiazole sulphenamide, an accelerator available from R. T. Vanderbilt Co., Norwalk, Conn., U.S.A.

Captax®—2-mercaptobenzothiazole, an accelerator available from R. T. Vanderbilt Co., Norwalk, Conn., U.S.A.

TMTD—Tetramethyl thiuram disulfide, an accelerator available from R. E. Carroll, Trenton, N.J., U.S.A.

Vanax DPG—Diphenyl guanidine, an accelerator available from R. T. Vanderbilt Co., Norwalk, Conn., U.S.A.

Si-69—bis(3-triethoxysilylpropyl)tetrasulfide, a coupling agent from Degussa AG, Germany.

X50S—a mixture of Si-69 /carbon black N330, 50/50 by weight, from Degussa AG, Germany.

Sundex 8125—highly aromatic oil, from R. E. Carroll, Trenton, N.J., U.S.A.

Sunproof imp.—Sunproof improved, a mixture of waxy materials, from Uniroyal Chemical Co., Middlebury, Conn., U.S.A.

Sulfur—crosslinking agent from R. E. Carroll, Trenton, N.J., U.S.A.

The elastomer compositions were prepared in groups or "series." The mixing procedure was the same (except as indicated below), for all examples of a given series. The mixing procedures were as follows:

Mixing Procedures

The compounds were prepared using either a two-stage or three-stage mixing procedure as indicated in the following tables, Table I-A through Table VI-A. The internal mixer used for preparing the compounds was a Plasti-Corder EPL-V (obtained from C. W. Brabender, South Hackensack, N.J.) equipped with a cam-type mixing head (capacity 600 ml).

In the first stage, the mixer was set at 80° C. and the rotor speed was set at 60 rpm. After the mixer was conditioned to 100° C. by heating the chamber with a dummy mixture, the elastomer was loaded and masticated for 1 minute. Thereafter the mixing procedure in the first stage differed for different examples as described below. All amounts are shown in parts per hundred rubber (phr). In Table I-A through Table VI-A below, certain examples identified as "OF" show the improvement achieved by delayed addition of the oil during the first mixing stage. In examples indicated as "S1" the sulfur crosslinking agent was added during the first stage in accordance with the present invention. On Examples indicated as "S3" sulfur was added only as part of a complete vulcanization system during the third stage mixing.

The mixing time shown for each example in the following tables is the total mixing time of the first stage (in the case of two-stage mixing) or of the first two stages (in the case of three-stage mixing).

A-series of compounds (see Table I-A):

Standard mixing procedure: Carbon black, preblended with Sundex 8125 then added. Mixing was continued for an additional three minutes, achieving substantial dispersion of the filler. The resultant stage 1 masterbatch was then dumped from the mixer at four minutes total. The dump temperature was between 150–160° C. It was then passed through an open mill (four inch, two-roll mill, obtained from C. W. Brabender, South Hackensack, N.J.) three times and then stored at room temperature for two hours.

S1 mixing procedure: The same as standard mixing procedure except the sulfur was preblended with carbon black and added in the first stage. In the A-series of examples, all of which were 3-stage procedures, no sulfur was added in the second or third stage.

123% S1 mixing procedure: Same as S1 mixing procedure, except that (example compounds A3, A6 and A9) an additional 0.4 phr sulfur was added (as indicated); such additional sulfur was added in the first stage.

B-A-series of compound (see Table II-A):

Standard mixing procedure: Carbon black, pre-blended with Sundex 8125 was then added, mixing for an additional three minutes. The resultant stage 1 masterbatch was dumped from the mixer at four minutes total and then passed through an open mill three times and then stored at room temperature for two hours.

S1 mixing procedure: The same as B-A-series standard mixing procedure except the sulfur, preblended with carbon black and oil, was added in the first stage. In the B-A-series of examples, all of which were three stage procedures, no sulfur was added in the second or third stage of the S1 mixing procedure examples.

B-B-series of compounds (see Table III-A):

S3-OF mixing procedure: Carbon black was then added. After mixing for an additional 2.5 minutes, or when the temperature reached about 160° C., the oil was added. The resultant stage 1 masterbatch was dumped from the mixer at eight minutes total, then passed through an open mill three times and stored at room temperature for two hours.

S1-OF mixing procedure: The same as S3-OF mixing procedure except the sulfur, preblended with carbon black, was added in the first stage. In the B—B series of examples, all of which were 3-stage procedures, no sulfur was added in the second or third stage of the S1-Of mixing procedure examples.

C-series of compounds (see Table IV-A):

S3-OF mixing procedure: The same as S3-OF mixing procedure for B—B series of compounds except the masterbatch was dumped from the mixer at nine minutes total.

S1-OF mixing procedure: The same as S1-OF mixing procedure for B—B series of compounds except the masterbatch was dumped from the mixer at nine minutes total.

D-series of compounds (see Table V-A):

Standard mixing procedure: Filler, e.g., carbon black, pre-blended with coupling agent (Si-69 or X50S, if any) and Sundex 8125 oil was then added, mixing for an additional seven minutes. The resultant stage 1 masterbatch was then dumped from the mixer at eight minutes total and then passed through an open mill three times and then stored at room temperature for two hours.

S1-OF mixing procedure: The same as S1-OF mixing procedure for B—B series of compounds.

S1-OF mixing procedure (and two stage mixing procedure for compound Do): The same as S1-OF mixing procedure for B—B series of compounds, but all other ingredients except accelerators were added after the first addition of oil.

E-series of compound (see Table VI-A):

Standard mixing procedure: Carbon black filler, pre-blended with coupling agent (Si-69 if any) and Sundex 8125 oil was then added, mixing for an additional three minutes. The resultant stage 1 masterbatch was dumped from the mixer at four minutes total, then passed through an open mill three times and stored at room temperature for two hours.

S1-OF mixing procedure: The same as S1-OF mixing procedure for B—B series of compounds.

In the second stage (of all 3-stage processes), the mixing chamber temperature was set to 80° C. and the rotor speed was set at 60 rpm. After the mixer was conditioned to 100° C. by heating the chamber with a dummy mixture, the masterbatch from first stage was loaded and masticated for 1 minute. The mixing procedure in the second stage differed for different examples as described below:

A-series (see Table I-A):

After the stage 1 masterbatch was masticated for one minute, zinc oxide and stearic acid were added. Flexzone 7P was added one minute later. The masterbatch was then dumped from the mixer at four minutes total, then passed through an open mill three times, and then stored at room temperature for two hours.

B-A-series (see Table II-A):

After the stage 1 masterbatch was masticated for one minute, zinc oxide and stearic acid were added. Flexzone 7P and Sunproof Improved were added at one minute later. The masterbatch was then dumped from the mixer at four minutes total, then passed through an open mill three times and stored at room temperature for two hours.

B-B-series (see Table III-A):

The same as the mixing procedure of the second stage described for B-A-series of compounds.

C-series (see Table IV-A):

The same as the mixing procedure of the second stage described for B-A-series of compounds.

D-series (see Table V-A):

The same as the mixing procedure of the second stage described for B-A-series of compound, except for compound D7 there is no second stage.

E-series (see Table VI-A):

The same as the mixing procedure of the second stage described for B-A-series of compounds.

In the last stage, the mixing chamber temperature was set to 80° C. and the rotor speed was set to 35 rpm. After the mixer was conditioned the masterbatch from stage two was loaded and mixed for one minute. The curative additive (including sulfur and accelerators for S3 and standard mixing procedures and only accelerators for S1 mixing procedures) was then added. The material was dumped from the mixer at two minutes and passed through the open mill three times.

TABLE I-A

Series A Compounds Formulations and Mixing Procedures

| Compound | A1 | A2 | A3 | A4 | A5 | A6 | A7 | A8 | A9 |
|---|---|---|---|---|---|---|---|---|---|
| FSSBR NS-116 | 70 | 70 | 70 | | | | 70 | 70 | 70 |
| FSSBR NS-114 | 30 | 30 | 30 | | | | 30 | 30 | 30 |
| SSBR Duradene 715 | | | | 100 | 100 | 100 | | | |
| Carbon black N234 | 50 | 50 | 50 | 50 | 50 | 50 | | | |
| CRX 2000 | | | | | | | 50 | 50 | 50 |
| Sulfur | | | 0.4 | | | 0.4 | | | 0.4 |
| Zinc Oxide | 3 | 3 | 3 | 3 | 3 | 3 | 3 | 3 | 3 |
| Stearic Acid | 2 | 2 | 2 | 2 | 2 | 2 | 2 | 2 | 2 |
| Flexzone 7p | 1 | 1 | 1 | 1 | 1 | 1 | 1 | 1 | 1 |
| Durax | 1.3 | 1.3 | 1.3 | 1.3 | 1.3 | 1.3 | 1.3 | 1.3 | 1.3 |
| Captax | 0.2 | 0.2 | 0.2 | 0.2 | 0.2 | 0.2 | 0.2 | 0.2 | 0.2 |
| Sulfur | 1.8 | 1.8 | 1.8 | 1.8 | 1.8 | 1.8 | 1.8 | 1.8 | 1.8 |
| Mixing | | | | | | | | | |
| Mixing procedure | Standard | S1 | 123% S1 | Standard | S1 | 123% S1 | Standard | S1 | 123% S1 |
| Mixing time (min.) | 8 | 8 | 8 | 8 | 8 | 8 | 8 | 8 | 8 |
| Total mixing stages | 3 | 3 | 3 | 3 | 3 | 3 | 3 | 3 | 3 |

TABLE II-A

Series B-A Compounds Formulations and Mixing Procedures

| Compound | B1-A | B2-A | B3-A | B4-A | B5-A | B6-A |
|---|---|---|---|---|---|---|
| SSBR Duradene 715 | 75 | 75 | | | | |
| FSSBR NS-116 | | | 75 | 75 | | |
| ESBR SBR 1500 | | | | | 75 | 75 |
| BR Taktene 1203 | 25 | 25 | 25 | 25 | 25 | 25 |
| Carbon black N234 | 75 | 75 | 75 | 75 | 75 | 75 |
| Sundex 8125 | 25 | 25 | 25 | 25 | 25 | 25 |
| Zinc Oxide | 3.5 | 3.5 | 3.5 | 3.5 | 3.5 | 3.5 |
| Stearic Acid | 2 | 2 | 2 | 2 | 2 | 2 |
| Flexzone 7p | 1.5 | 1.5 | 1.5 | 1.5 | 1.5 | 1.5 |
| Sunproof Imp. | 1.5 | 1.5 | 1.5 | 1.5 | 1.5 | 1.5 |

TABLE II-A-continued

Series B-A Compounds Formulations and Mixing Procedures

| Compound | B1-A | B2-A | B3-A | B4-A | B5-A | B6-A |
|---|---|---|---|---|---|---|
| Durax | 1.5 | 1.5 | 1.5 | 1.5 | 1.5 | 1.5 |
| TMTD | 0.4 | 0.4 | 0.4 | 0.4 | 0.4 | 0.4 |
| Sulfur | 1.4 | 1.4 | 1.4 | 1.4 | 1.4 | 1.4 |
| Mixing | | | | | | |
| Mixing procedure | Standard | S1 | Standard | S1 | Standard | S1 |
| Mixing time (min.) | 8 | 8 | 8 | 8 | 8 | 8 |
| Total mixing stages | 3 | 3 | 3 | 3 | 3 | 3 |

TABLE III-A

Series B-B Compounds Formulations and Mixing Procedures

| Compound | B1-B | B2-B | B3-B | B4-B | B5-B | B6-B |
|---|---|---|---|---|---|---|
| SSBR Duradene 715 | 75 | 75 | | | | |
| FSSBR NS-116 | | | 75 | 75 | | |
| ESBR SBR 1500 | | | | | 75 | 75 |
| BR Taktene 1203 | 25 | 25 | 25 | 25 | 25 | 25 |
| Carbon black N234 | 75 | 75 | 75 | 75 | 75 | 75 |
| Sundex 8125 | 25 | 25 | 25 | 25 | 25 | 25 |
| Zinc Oxide | 3.5 | 3.5 | 3.5 | 3.5 | 3.5 | 3.5 |
| Stearic Acid | 2 | 2 | 2 | 2 | 2 | 2 |
| Flexzone 7p | 1.5 | 1.5 | 1.5 | 1.5 | 1.5 | 1.5 |
| Sunproof Imp. | 1.5 | 1.5 | 1.5 | 1.5 | 1.5 | 1.5 |
| Durax | 1.5 | 1.5 | 1.5 | 1.5 | 1.5 | 1.5 |

TABLE III-A-continued

Series B-B Compounds Formulations and Mixing Procedures

| Compound | B1-B | B2-B | B3-B | B4-B | B5-B | B6-B |
|---|---|---|---|---|---|---|
| TMTD | 0.4 | 0.4 | 0.4 | 0.4 | 0.4 | 0.4 |
| Sulfur | 1.4 | 1.4 | 1.4 | 1.4 | 1.4 | 1.4 |
| Mixing | | | | | | |
| Mixing procedure | S3, FO | S1, FO | S3, FO | S1, FO | S3, FO | S1, FO |
| Mixing time (min.) | 12 | 12 | 12 | 12 | 12 | 12 |
| Total mixing stage | 3 | 3 | 3 | 3 | 3 | 3 |

TABLE IV-A

Series C Compounds Formulations and Mixing Procedures

| Compound | C1 | C2 | C3 | C4 |
|---|---|---|---|---|
| SSBR Duradene 715 | 75 | 75 | | |
| FSSBR NS-116 | | | 75 | 75 |
| BR Taktene 1203 | 25 | 25 | 25 | 25 |
| CRX 2000 | 75 | 75 | 75 | 75 |
| Si-69 | 4.50 | 4.50 | 4.50 | 4.50 |
| Sundex 8125 | 25 | 25 | 25 | 25 |
| Zinc Oxide | 3.5 | 3.5 | 3.5 | 3.5 |
| Stearic Acid | 2 | 2 | 2 | 2 |
| Flexzone 7p | 1.5 | 1.5 | 1.5 | 1.5 |
| Sunproof Imp. | 1.5 | 1.5 | 1.5 | 1.5 |
| Durax | 1.5 | 1.5 | 1.5 | 1.5 |
| Vanax DPG | 1 | 1 | 1 | 1 |
| TMTD | 0.4 | 0.4 | 0.4 | 0.4 |
| Sulfur | 1.4 | 1.4 | 1.4 | 1.4 |
| Mixing | | | | |
| Mixing procedure | S3, FO | S1, FO | S3, FO | S1, FO |
| Mixing time (min.) | 13 | 13 | 13 | 13 |
| Total mixing stages | 3 | 3 | 3 | 3 |

TABLE V-A

Series D Compounds Formulations and Mixing Procedures

| Compound | D1 | D2 | D3 | D4 | D5 | D6 | D7 | D8 |
|---|---|---|---|---|---|---|---|---|
| FSSBR NS-116 | 75 | 75 | 75 | 75 | 75 | 75 | 75 | 75 |
| BR Taktene 1203 | 25 | 25 | 25 | 25 | 25 | 25 | 25 | 25 |
| CRX 2000 | 75 | 75 | 75 | 75 | 75 | 75 | 75 | |
| Silica Zeosil 1165 | | | | | | | | 75 |
| Si-69 | 4.50 | 4.50 | 3.40 | 2.25 | 1.13 | 0.00 | 2.25 | |
| X50S | | | | | | | | 12 |
| Sundex 8125 | 25 | 25 | 25 | 25 | 25 | 25 | 25 | 25 |
| Zinc Oxide | 3.5 | 3.5 | 3.5 | 3.5 | 3.5 | 3.5 | 3.5 | 3.5 |
| Stearic Acid | 2 | 2 | 2 | 2 | 2 | 2 | 2 | 2 |
| Flexzone 7p | 1.5 | 1.5 | 1.5 | 1.5 | 1.5 | 1.5 | 1.5 | 1.5 |
| Sunproof Imp. | 1.5 | 1.5 | 1.5 | 1.5 | 1.5 | 1.5 | 1.5 | 1.5 |
| Durax | 1.5 | 1.5 | 1.5 | 1.5 | 1.5 | 1.5 | 1.5 | 1.5 |
| Vanax DPG | 1 | 1 | 1 | 1 | 1 | 1 | 1 | 1 |
| TMTD | 0.4 | 0.4 | 0.4 | 0.4 | 0.4 | 0.4 | 0.4 | 0.4 |
| Sulfur | 1.4 | 1.4 | 1.4 | 1.4 | 1.4 | 1.4 | 1.4 | 1.4 |
| Mixing | | | | | | | | |
| Mixing procedure | Standard | S1, FO | S1, FO | S1, FO | S1, FO | S1, FO | S1, FO | S1, FO |
| Mixing time, min | 12 | 12 | 12 | 12 | 12 | 12 | 8 | 12 |
| Total mixing stage | 3 | 3 | 3 | 3 | 3 | 3 | 2 | 3 |

TABLE VI-A

| Compound | Formulations | | | | | |
|---|---|---|---|---|---|---|
| | E1 | E2 | E3 | E4 | E5 | E6 |
| SSBR Duradene 715 | 75 | 75 | 75 | 75 | 75 | 75 |
| BR Taktene 1203 | 25 | 25 | 25 | 25 | 25 | 25 |
| CRX 2000 | 75 | 75 | 75 | 75 | 75 | 75 |
| Si-69 | 4.50 | 4.50 | 3.40 | 2.25 | 1.13 | 0.00 |
| Sundex 8125 | 25 | 25 | 25 | 25 | 25 | 25 |
| Zinc Oxide | 3.5 | 3.5 | 3.5 | 3.5 | 3.5 | 3.5 |
| Stearic Acid | 2 | 2 | 2 | 2 | 2 | 2 |
| Flexzone 7p | 1.5 | 1.5 | 1.5 | 1.5 | 1.5 | 1.5 |
| Sunproof Imp. | 1.5 | 1.5 | 1.5 | 1.5 | 1.5 | 1.5 |
| Durax | 1.5 | 1.5 | 1.5 | 1.5 | 1.5 | 1.5 |
| Vanax DPG | 1 | 1 | 1 | 1 | 1 | 1 |
| TMTD | 0.4 | 0.4 | 0.4 | 0.4 | 0.4 | 0.4 |
| Sulfur | 1.4 | 1.4 | 1.4 | 1.4 | 1.4 | 1.4 |
| Mixing | | | | | | |
| Mixing procedure | Standard | S1, FO | S1, FO | S1, FO | S1, FO | S1, FO |
| Mixing time, min | 8 | 12 | 12 | 12 | 12 | 12 |
| Total mixing stage | 3 | 3 | 3 | 3 | 3 | 3 |

The elastomeric compounds prepared in accordance with the above mixing procedures were tested. Specifically, representative samples of the compositions were subjected to the following test procedures.

Test Methods for Compounds

Cure characteristics (Rheometer data)—ASTM D-2084.
Mooney viscosity (measured for the pre-cured material)—ASTM D-1646.
Hardness—ASTM D-2240.
Modulus at recited percentage elongation—ASTM D-412.
Tensile strength (modules at break)—ASTM D-412.
Elongation at break—ASTM D-412.
Bound rubber—The bound rubber content of an elastomeric compound incorporating filler was determined by extraction of the elastomeric compound with toluene at room temperature.
Dynamic hysteresis (tan d)—was determined using a Rheometrics Dynamic Spectrometer II (RDS II, Rheometrics, Inc., N.J.) with strain sweep. The measurements were made at 0 and 70° C. with strain sweeps over a range of double strain amplitude (DSA from 0.2 to 120%). The maximum tan δ values on the strain sweep cures were taken for comparing the hysteresis among elastomeric compounds.
Abrasion resistance was determined using an abrader, which is based on a Lambourn-type machine as described in U.S. Pat. No. 4,995,197, hereby incorporated by reference. The tests were carried out at 14% slip. The percentage slip is determined based on the relative velocities of a sample wheel and a grindstone wheel. The abrasion resistance index is calculated from the mass loss of the elastomeric compound.

The test results for the compositions prepared in the examples above (identified by series number, e.g., "compound A1" etc.) are presented in the tables below. Abrasion values repeated in the tables below are normalized. That is, the abrasion value for the first example in each group of compounds reported is set at 100%. The abrasion results for all other examples in that group are referenced to the first compound of that group. It will be understood, therefore, that a higher abrasion value corresponds to higher abrasion resistance.

TABLE I-B

| Compound | A1 | A2 | A3 | A4 | A5 | A6 | A7 | A8 | A9 |
|---|---|---|---|---|---|---|---|---|---|
| Polymer[a] | FSSBR | FSSBR | FSSBR | SSBR | SSBR | SSBR | FSSBR | FSSBR | FSSBR |
| Carbon Black | N234 | N234 | N234 | N234 | N234 | N234 | CRX 2000 | CRX 2000 | CRX 2000 |
| Mixing procedure | Standard | S1 | 123% S1 | Standard | S1 | 123% S1 | Standard | S1 | 123% S1[b] |
| Rheometer data @ 145° C. | | | | | | | | | |
| Minimum torque, dN.m | 10.6 | 12.2 | 10.9 | 11.3 | 15.2 | 13.9 | 10.6 | 11.8 | 10.2 |
| Maximum torque, dN.m | 40.2 | 39.9 | 45.6 | 41.7 | 42.1 | 42.3 | 38.2 | 37.6 | 39.1 |
| $t_2$, min | 4.4 | 4.3 | 4.0 | 5.3 | 4.9 | 5.3 | 5.7 | 6.0 | 6.0 |
| $t_{90}$, min | 17.2 | 15.4 | 14.9 | 17.6 | 16.1 | 17.4 | 20.4 | 20.1 | 21.7 |
| Bound rubber, % | 36.9 | 49.0 | 43.2 | 40.4 | 62.9 | 51.2 | 34.1 | 48.3 | 41.4 |
| Hardness, A2 | 71 | 72 | 73 | 72.0 | 72.0 | 73.0 | 67 | 68 | 69 |
| 100% modulus, MPa | 2.8 | 2.7 | 3.1 | 2.8 | 3.2 | 3.2 | 2.2 | 2.1 | 2.4 |
| 200% modulus, MPa | 7.3 | 7.5 | 8.8 | 7.6 | 9.2 | 9.5 | 5.4 | 5.7 | 6.9 |
| 300% modulus, MPa | 13.7 | 14.3 | 16.1 | 14.6 | | | 10.7 | 11.8 | 13.5 |
| Tensile strength, MPa | 15.7 | 20.0 | 18.7 | 18.9 | 15.8 | 16.9 | 16.7 | 18.2 | 20.9 |
| Elongation at break, % | 332 | 385 | 338 | 361 | 278 | 287 | 402 | 399 | 412 |
| tan $\delta_{max}$, 0° C. | 0.623 | 0.658 | 0.652 | 0.444 | 0.464 | 0.454 | 0.720 | 0.689 | 0.641 |
| tan $\delta_{max}$, 70° C. | 0.158 | 0.132 | 0.122 | 0.156 | 0.140 | 0.132 | 0.128 | 0.109 | 0.106 |
| Abrasion index, %, 14% slip | 100 | 114 | 100 | 100 | 113 | 105 | 100 | 123 | 124 |
| Abrasion index, %, 21% slip | 100 | 108 | 112 | 100 | 118 | 126 | 100 | 112 | 113 |

TABLE II-B

| Compound | B1-A | B2-A | B3-A | B4-A | B5-A | B6-A |
|---|---|---|---|---|---|---|
| Polymer | SSBR/BR | SSBR/BR | FSSBR/BR | FSSBR/BR | ESBR/BR | ESBR/BR |
| Mixing procedure | Standard | S1 | Standard | S1 | Standard | S1 |
| Mixing time, min | 8 | 8 | 8 | 8 | 8 | 8 |
| Rheometer data at 145° C. | | | | | | |
| Minimum torque, dN.m | 8.3 | 9.9 | 6.7 | 7.8 | 6.8 | 7.2 |
| Maximum torque, dN.m | 34.5 | 33.8 | 27.6 | 31.1 | 25.9 | 27.6 |

TABLE II-B-continued

| Compound | B1-A | B2-A | B3-A | B4-A | B5-A | B6-A |
|---|---|---|---|---|---|---|
| Polymer | SSBR/BR | SSBR/BR | FSSBR/BR | FSSBR/BR | ESBR/BR | ESBR/BR |
| Mixing procedure | Standard | S1 | Standard | S1 | Standard | S1 |
| Mixing time, min | 8 | 8 | 8 | 8 | 8 | 8 |
| $t_2$, min | 11.4 | 10.1 | 12.1 | 7.5 | 11.3 | 7.9 |
| $t_{90}$, min | 20.8 | 20.8 | 21.6 | 16.4 | 23.8 | 20.8 |
| $ML_{1+4}$ @ 100° C. | 79 | 83 | 87 | 90 | 69 | 72 |
| Bound rubber, % | 41.0 | 48.7 | 37.9 | 42.6 | 37.5 | 42.1 |
| Hardness, A2 | 70 | 70 | 74 | 72 | 69 | 70 |
| 100% modulus, MPa | 2.2 | 2.3 | 2.4 | 2.5 | 1.7 | 2.1 |
| 200% modulus, MPa | 5.1 | 5.7 | 5.6 | 5.9 | 3.7 | 5.0 |
| 300% modulus, MPa | 9.2 | 10.3 | 9.6 | 10.3 | 13.8 | 9.3 |
| Tensile strength, MPa | 17.8 | 18.1 | 10.8 | 18.1 | 12.7 | 17.4 |
| Elongation at break, % | 547 | 502 | 329 | 514 | 475 | 523 |
| $\tan \delta_{max}$ 0° C. | 0.473 | 0.464 | 0.532 | 0.521 | 0.430 | 0.411 |
| $\tan \delta_{max}$ 70° C. | 0.292 | 0.284 | 0.298 | 0.270 | 0.346 | 0.299 |
| Abrasion index, %, 14% slip | 100 | 108 | 100 | 102 | 100 | 123 |
| Abrasion index, %, 21% slip | 100 | 113 | 100 | 131 | 100 | 118 |

TABLE III-B

| Compound | B1-B | B2-B | B3-B | B4-B | B5-B | B6-B |
|---|---|---|---|---|---|---|
| Polymer | SSBR/BR | SSBR/BR | FSSBR/BR | FSSBR/BR | ESBR/BR | ESBR/BR |
| Mixing procedure | S3, FO | S1, FO | S3, FO | S1, FO | S3, FO | S1, FO |
| Mixing time, min | 12 | 12 | 12 | 12 | 12 | 12 |
| Rheometer data at 145° C. | | | | | | |
| Minimum torque, dN.m | 9.5 | 11.3 | 7.7 | 8.1 | 7.0 | 7.7 |
| Maximum torque, dN.m | 28.4 | 30.8 | 28.1 | 28.5 | 26.6 | 27.1 |
| $t_2$, min | 11.8 | 7.8 | 12.1 | 8.1 | 10.4 | 6.8 |
| $t_{90}$, min | 20.1 | 17.3 | 21.5 | 17.3 | 22.8 | 19.9 |
| $ML_{1+4}$ @ 100° C. | 70 | 89 | 82 | 85 | 65 | 71 |
| Bound rubber, % | 45.3 | 62.0 | 46.6 | 57.2 | 43.6 | 50.1 |
| Hardness, A2 | 69 | 69 | 71 | 69 | 70 | 69 |
| 100% modulus, MPa | 2.3 | 2.4 | 2.4 | 2.7 | 2.0 | 2.0 |
| 200% modulus, MPa | 6.1 | 6.6 | 5.9 | 7.2 | 4.8 | 5.3 |
| 300% modulus, MPa | 11.3 | 12.3 | 10.8 | 13.0 | 9.5 | 10.4 |
| Tensile strength, MPa | 17.2 | 17.5 | 15.9 | 20.4 | 16.9 | 18.5 |
| Elongation at break, % | 434 | 407 | 423 | 467 | 481 | 492 |
| $\tan \delta_{max}$, 0° C. | 0.454 | 0.412 | 0.524 | 0.485 | 0.405 | 0.403 |
| $\tan \delta_{max}$, 70° C. | 0.243 | 0.226 | 0.279 | 0.231 | 0.272 | 0.251 |
| Abrasion index, %, 14% slip | 100 | 125 | 100 | 114 | 100 | 103 |
| Abrasion index, %, 21% slip | 100 | 161 | 100 | 127 | 100 | 112 |

TABLE IV-B

| Compound | C1 | C2 | C3 | C4 |
|---|---|---|---|---|
| Polymer | SSBR/BR | SSBR/BR | FSSBR/BR | FSSBR/BR |
| Mixing procedure | S3, FO | S1, FO | S3, FO | S1, FO |
| Mixing time, min | 13 | 13 | 13 | 13 |
| Rheometer data at 145° C. | | | | |
| Minimum torque, dN.m | 14.6 | 14.5 | 11.8 | 11.9 |
| Maximum torque, dN.m | 34.5 | 36.0 | 31.6 | 32.7 |
| $t_2$, min | 2.7 | 2.6 | 4.3 | 3.2 |
| $t_{90}$, min | 12.2 | 12.5 | 11.0 | 7.5 |
| $ML_{1+4}$ @ 100° C. | 80.0 | 95.0 | 85.0 | 89.0 |
| Bound rubber % | 75.4 | 81.0 | 62.3 | 68.5 |
| Hardness, A2 | 71 | 72 | 68 | 68 |
| 100% modulus, MPa | 3.0 | 2.9 | 2.1 | 2.5 |
| 200% modulus, MPa | 8.7 | 9.7 | 4.5 | 7.3 |
| 300% modulus, MPa | 15.6 | | 8.3 | 13.7 |
| Tensile strength, MPa | 17.6 | 17.5 | 16.1 | 17.9 |
| Elongation at break, % | 325 | 291 | 488 | 372 |
| $\tan \delta_{max}$, 0° C. | 0.366 | 0.371 | 0.438 | 0.440 |
| $\tan \delta_{max}$, 70° C. | 0.134 | 0.121 | 0.125 | 0.102 |
| Abrasion index, %, 14% slip | 100 | 95 | 100 | 100 |
| Abrasion index, %, 21% slip | 100 | 111 | 100 | 98 |

The foregoing test results shown in Table I-B through Table VI-B demonstrate the significant improvements achieved in various important performance characteristics for the example compounds embodying the invention disclosed above. In Table I-B, the values measured for tan $\delta_{max}$ at 70° C. show excellent results for embodiments of the present invention, and in some respects significant improvement over comparable prior art. Examples A2 and A3, wherein sulfur crosslinking agent was added during the first stages, have advantageously lower tan $\delta_{max}$ values than that of Example A1, wherein sulfur was added only in the last stage (in accordance with prior art techniques) along with accelerations, etc., as part of a vulcanization system. Similarly, the tan $\delta_{max}$ values for Examples A5 and A6 are lower than that of Examples A4. The tan $\delta_{max}$ values for Examples A8 and A9 (employing silicon-treated carbon black filler) are advantageously lower than that of Example A7 which, again, is comparable to Examples A8 and A9 except for the late stage versus early stage addition of sulfur. Highly advantageous abrasion resistance results are shown for the embodiment of the present invention. The abrasion index values for Example A2 at both 14% slip and 21% slip are significantly better than those values for the comparable Example A1. The invention embodiment of Example A3 also has excellent abrasion resistance, being equal to that of Example A1 at 14% slip and substantially better at 21% slip. Similarly, each of Examples A5 and A6 is significantly better than comparable Example A4 at both 14% slip and 21% slip. Likewise, significant improvement in abrasion resistance at both 14% slip and 21% slip is shown for Examples A8 and A9 versus comparable Example A7. Other material properties and performance characteristics shown in Table I-B for the embodiments of the present invention involving early stage sulfur addition also are seen to have good values.

In Table II-B, significantly improved tan $\delta_{max}$ 70° C. values are shown for the early stage sulfur addition examples (B2-A, B4-A and B6-A) over that of the comparable example with only late-stage sulfur addition (B1-A, B3-A and B5-A, respectively). Also, the abrasion resistance of each is seen to be significantly improved. Thus, the abrasion resistance of Example B2-A is better than that of Example B1-A at both 14% slip and 21% slip. The abrasion resistance of Example B4-A is better than that of Example B3-A at both 14% slip and 21% slip. The abrasion resistance of Example B6-A is better than that of Example B5-A at both 14% slip and 21% slip.

Even greater improvement is seen for examples embodying the present invention, wherein the sulfur crosslinking agent and filler were added and at least substantially dispersed while the elastomer was still oil-free in the early stage. Thus, in Table III-B the abrasion resistance of Example B2-B (having early stage, oil free sulfur addition) is seen to far exceed that of comparable Example B1-B (having only late-stage sulfur addition). Likewise, the abrasion value for early stage oil-free sulfur addition Example B4-B are significantly improved over comparable late stage sulfur addition Example B3-B. Similarly, the abrasion resistance of Example B6-B is better than that of Example B5-B. Excellent tan $\delta_{max}$ 70° C. values also are shown for the early stage, oil-free sulfur addition examples B2-B, B4-B and B6-B. Notable in this regard, the tan $\delta_{max}$ 70° C. value for Example B4-B is 0.231, far lower than the tan $\delta_{max}$ 70° C. value of 0.279 for comparable Example B3-B.

Similar improvement is shown in Table IV-B for invention embodiments C2 and C4 over comparable late stage sulfur addition examples C1 and C3, respectively. All of the C-series examples (just as the B—B-series examples) added and at least substantially dispersed the filler oil-free. For Example C2 having early stage sulfur addition, advantageously lower tan $\delta_{max}$ 70° value and advantageously higher abrasion resistance at 21% slip are shown over Example C1 having only late stage sulfur addition. Similarly, lower tan $\delta_{max}$ 70° C. and comparable abrasion resistance are shown for Example C4 compared to Example C3.

Test results for the D-series examples are shown in Table V-B. The D-Series examples employ silicon-modified carbon black filler and the costly additive Si-69 (discussed above). Example D1 was a standard three stage mixing procedure employing 4.50 phr Si-69. Examples D2 through D7 all employed early stage, oil-free addition of filler and sulfur crosslinking agent in accordance with preferred embodiments of the present invention. Example D2 which used the same 4.50 phr Si-69 as in Example D1 is seen to have a much lower tan $\delta_{max}$ 70° C. value than Example D1 and also significantly improved abrasion resistance at both 4% slip and 21% slip. In Example D3 through D5, the amount of costly Si-69 is progressively reduced, yet advantageously improved tan $\delta_{max}$ 70° C. values and abrasion resistance values are still achieved over Example D1. Even with no Si-69, Example D6 demonstrates that good tan $\delta_{max}$ 70° C. and abrasion resistance can be achieved by the early stage, oil free addition of sulfur and filler preblend in accordance with preferred embodiments of the present invention. Even using reduced Si-69 (2.25 phr) and only two mixing stages rather than three, Example D7 shows that good tan $\delta_{max}$ 70° value can be achieved by the invention along with abrasion resistance significantly improved over that of Example D1.

Figure 2:
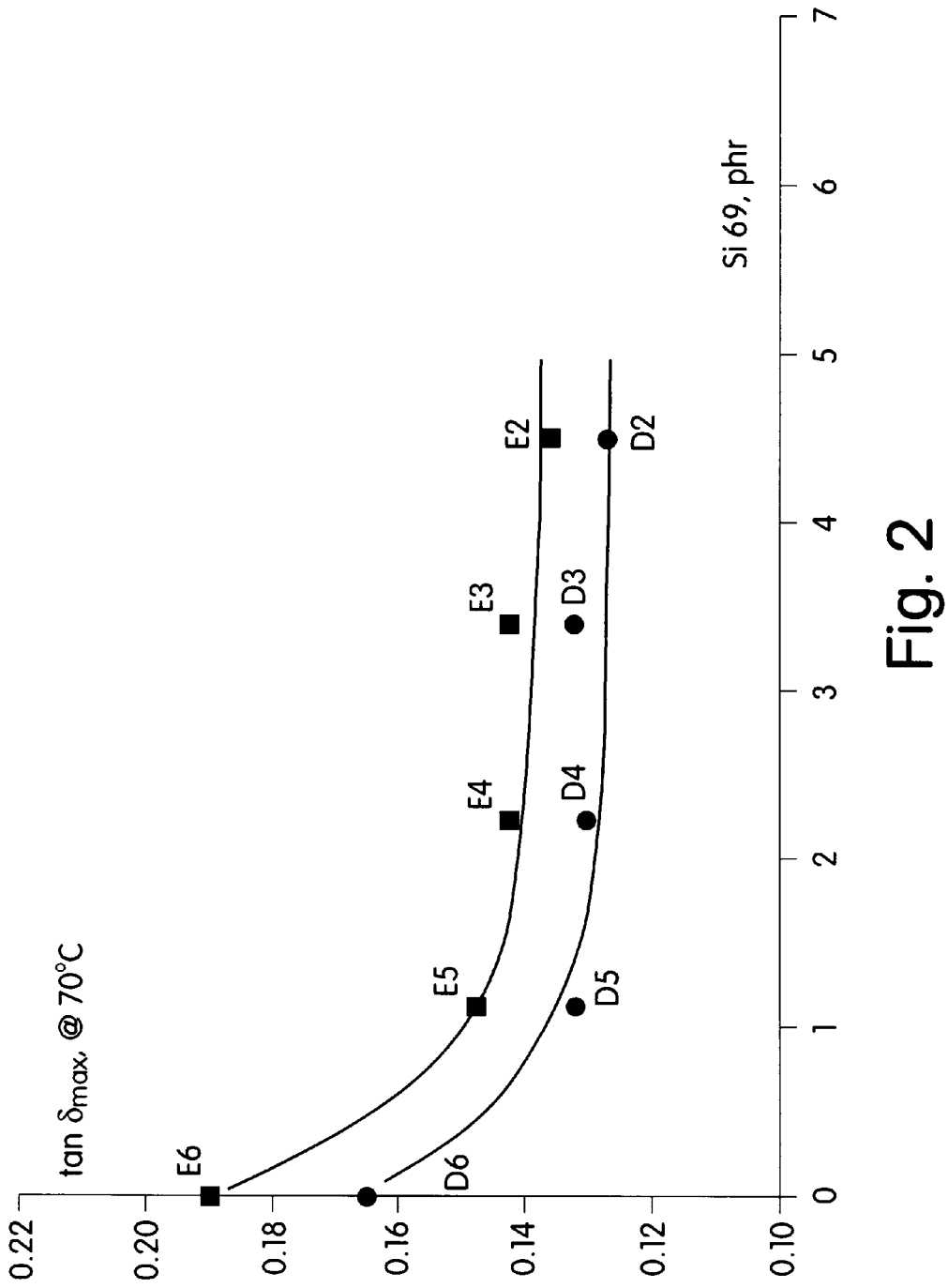
FIG. 2 is a graph showing improved vulcanizate hysteresis properties achieved by the present invention, even at reduced levels of costly coupling agent widely used to enhance this performance characteristic.

Results similar to those of the D-series examples were achieved for the E-series examples, as shown in Table VI-B. Whereas the D-series examples used NS116 elastomer, the E-series examples used Duradene 715 and butyl rubber. Thus, compared to Example EI, excellent improvement in abrasion resistance and tan $\delta_{max}$ 70° values are shown for Example E2 through E6 notwithstanding the progressively reduced amounts of the costly additive Si-69. The excellent tan $\delta_{max}$ 70° values for the early stage, oil-free addition examples E2 through E6 and D2 through D6 are shown as a function of Si-69 usage in the graph of FIG. 2. It can be seen in FIG. 2 that advantageously low usage levels of Si-69 provide approximately maximum benefit in tan $\delta_{max}$ 70° C. value for preferred embodiment of the present invention employing silicon-modified carbon black filler.

As noted above in reference to the test results shown in Table I-B, the test results shown in Table I-B, the test results shown in Table II-B through VI-B, in addition to the excellent tan $\delta_{max}$ 70° and abrasion resistance values, demonstrate good material properties and performance characteristics for the materials produced in accordance with the examples having early stage sulfur addition, including those having oil-free early stage addition.

In view of the forgoing disclosure, those skilled in the art will recognize that various modifications can be made to the preferred embodiments discussed above without departing from the true scope and spirit of the invention.

We claim:

1. A multi-stage process for producing substantially unvulcanized elastomer composition, comprising:

in an early stage of the multi-stage process, substantially dispersing particulate filler selected from modified carbon blacks and sulfur crosslinking agent into sulfur crosslinkable hydrocarbon elastomer to produce a substantially unvulcanized elastomer masterbatch, the sulfur crosslinking agent comprising sulfur or sulfur donor effective to crosslink the hydrocarbon elastomer; and then producing the substantially unvulcanized elastomer composition in at least one subsequent stage of the multi-stage process, comprising mechanical working of the masterbatch.

2. The multi-stage process for producing substantially unvulcanized elastomer composition in accordance with claim 1 wherein the sulfur crosslinking agent and filler are added to the elastomer in a first thermomechanical working stage of the multi-stage process.

3. The multi-stage process for producing substantially unvulcanized elastomer composition in accordance with claim 2 wherein the multi-stage process has two mechanical working stages.

4. The multi-stage process for producing substantially unvulcanized elastomer composition in accordance with claim 2 wherein the multi-stage process has three mechanical working stages.

5. The multi-stage process for producing substantially unvulcanized elastomer composition in accordance with claim 1 wherein a curative additive comprising accelerator for the sulfur crosslinking agent is added in a last mechanical working stage of the multi-stage process.

6. The multi-stage process for producing substantially unvulcanized elastomer composition in accordance with claim 5 wherein the curative additive further comprises additional sulfur crosslinking agent.

7. The multi-stage process for producing substantially unvulcanized elastomer composition in accordance with claim 1 further comprising adding and substantially dispersing oil during thermomechanical working after substantially dispersing the sulfur crosslinking agent and filler.

8. The multi-stage process for producing substantially unvulcanized elastomer in accordance with claim 7 wherein the oil is added during the same early stage as the filler and sulfur crosslinking agent.

9. The multi-stage process for producing substantially unvulcanized elastomer composition in accordance with claim 7 further comprising the step of mixing the filler and the sulfur crosslinking agent together in a pre-blend prior to being added to the elastomer.

10. The multi-stage process for producing substantially unvulcanized elastomer composition in accordance with claim 1 wherein the elastomer comprises natural rubber, chlorinated natural rubber, homo- or co-polymer of 1,3-butadiene, styrene, isobutylene, 2,3-dimethyl-1,3-butadiene, acrylonitrile, ethylene, propylene or a mixture of any of them.

11. The multi-stage process for producing substantially unvulcanized elastomer composition in accordance with claim 10 wherein the elastomer has a glass transition temperature as measured by differential scanning colorimetry of about −120° C. to about 0° C.

12. The multi-stage process for producing substantially unvulcanized elastomer composition in accordance with claim 1 wherein the elastomer comprises polyisoprene, styrene-butadiene copolymer, polybutadiene, ethylene-propylene copolymer, isobutalene, isopropylene, the oil extended derivative of any of them or a blend of any of them.

13. The multi-stage process for producing substantially unvulcanized elastomer composition in accordance with claim 1 wherein the elastomer comprises styrene-butadiene copolymer.

14. The multi-stage process for producing substantially unvulcanized elastomer composition in accordance with claim 1 wherein the filler comprises a mixture of modified carbon black with carbon black, silica or a mixture of any of them.

15. The multi-stage process for producing substantially unvulcanized elastomer composition in accordance with claim 1 wherein the filler comprises carbon black and modified carbon black.

16. The multi-stage process for producing substantially unvulcanized elastomer composition in accordance with claim 1 wherein the sulfur crosslinking agent comprises sulfur.

17. A multi-stage process for producing substantially unvulcanized elastomer composition, comprising:
    forming a pre-blend of particulate fillers comprising modified carbon black together with carbon black, silica or both, and sulfur crosslinking agent selected from sulfur donors and sulfur;
    in a first stage of the multi-stage process, adding and substantially dispersing the pre-blend into sulfur crosslinkable hydrocarbon elastomer by thermomechanical working, and then adding and substantially dispersing aromatic oil into the elastomer by subsequent thermomechanical working; and
    then thermomechanically working the masterbatch produced in the first stage in at least one additional stage during which a curative additive comprising accelerator for the sulfur crosslinking agent is added and substantially dispersed to the masterbatch to form the elastomer composition.

18. The multi-stage process for producing substantially unvulcanized elastomer composition in accordance with claim 17 wherein the accelerator comprises N-cyclohexane-2-benzothiazole sulphenamide, 2-mercaptobenzothiazole, tetramethyl thiuram disulfide, diphenyl guanidine or a mixture of any of them.

19. The multi-stage process for producing substantially unvulcanized elastomer composition in accordance with claim 17 wherein the curative additive further comprises additional sulfur crosslinking agent.

20. A substantially unvulcanized elastomer composition produced by a multi-stage process comprising:
    in an early stage of the multi-stage process, substantially dispersing particulate filler selected from modified carbon blacks and sulfur crosslinking agent into sulfur crosslinkable hydrocarbon elastomer by thermomechanical working to produce a substantially unvulcanized elastomer masterbatch, the sulfur crosslinking agent comprising, sulfur or other sulfur donor effective to crosslink the hydrocarbon elastomer; and
    then producing the substantially unvulcanized elastomer composition in a last stage of the multi-stage process, comprising further thermomechanical working of the masterbatch.

21. The substantially unvulcanized elastomer composition in accordance with claim 20 wherein the masterbatch further comprises oil added and substantially dispersed during thermomechanical working following addition and substantial dispersion of the sulfur crosslinking agent and filler.

22. The substantially unvulcanized elastomer composition of claim 20 wherein the elastomer comprises natural rubber, chlorinated natural rubber, homo- or co-polymer of 1,3-butadiene, styrene, isobutylene, 2,3-dimethyl-1,3-butadiene, acrylonitrile, ethylene, propylene or a mixture of any of them.

23. The substantially unvulcanized elastomer composition of claim 22 wherein the elastomer has a glass transition temperature as measured by differential scanning colorimetry of about −120° C. to about 0° C.

24. The substantially unvulcanized elastomer composition in accordance with claim 20 wherein the elastomer comprises polyisoprene, styrene-butadiene copolymer, polybutadiene, ethylene-propylene copolymer, isobutalene, isopropylene, the oil extended derivative of any of them or a mixture of any of them, the filler comprises carbon black, silica or modified carbon black, the sulfur crosslinking agent consists essentially of sulfur, and the accelerator comprises of N-cyclohexane-2-benzothiazole sulfenamide, 2-mercaptobenzothiazole, tetra methyl thiuram disulfide, diphenyl guanidine or a mixture of any of them.

25. A masterbatch comprising sulfur crosslinkable hydrocarbon elastomer, particulate filler, sulfur crosslinking agent and oil, the particulate filler, sulfur crosslinking agent and oil all being substantially homogeneously distributed throughout the elastomer and the masterbatch comprising substantially no accelerator for the sulfur crosslinking agent.

26. The masterbatch in accordance with claim 25 wherein the elastomer comprises polyisoprene, styrene-butadiene copolymer, polybutadiene, ethylene-propylene copolymer, isobutalene, isopropylene, the oil extended derivative of any of them or a mixture of any of them, the filler comprises modified carbon black together with carbon black, silica or both, and the sulfur crosslinking agent consists essentially of sulfur.

27. A vulcanizate produced by vulcanizing a substantially unvulcanized elastomer composition produced by a multi-stage process comprising:

in an early stage of the multi-stage process, substantially dispersing particulate filler selected from modified carbon blacks and sulfur crosslinking agent into sulfur crosslinkable hydrocarbon elastomer by thermomechanical working to produce a substantially unvulcanized elastomer masterbatch, the sulfur crosslinking agent being selected from sulfur and other sulfur donors effective to crosslink the hydrocarbon elastomer; and then producing the substantially unvulcanized elastomer composition in a last stage of the multi-stage process, comprising further mechanical working of the masterbatch.

28. Tire tread formed of a vulcanizate produced by vulcanizing a substantially unvulcanized elastomer composition produced by a multi-stage process comprising:

in an early stage of the multi-stage process, substantially dispersing particulate filler selected from modified carbon blacks and sulfur crosslinking agent into sulfur crosslinkable hydrocarbon elastomer by thermomechanical working to produce a substantially unvulcanized elastomer masterbatch, the sulfur crosslinking agent comprising sulfur or other sulfur donors effective to crosslink the hydrocarbon elastomer; and then producing the substantially unvulcanized elastomer composition in a last stage of the multi-stage process, comprising further mechanical working of the masterbatch.

29. A pre-blend comprising a substantially homogenous mixture of sulfur and particulate filler comprising modified carbon black.

30. The substantially unvulcanized elastomer composition of claim 20 wherein the multi-stage process further comprises the step of mixing the filler and the sulfur crosslinking agent together in a pre-blend prior to being added to the elastomer in said early stage of the multi-stage process.

31. The substantially unvulcanized elastomer composition of claim 21 wherein the oil is added during the same early stage as the filter and sulfur crosslinking agent.

* * * * *